(12) United States Patent
Cok et al.

(10) Patent No.: US 9,405,419 B2
(45) Date of Patent: Aug. 2, 2016

(54) ELECTRICALLY-CONDUCTIVE ARTICLES WITH ELECTRICALLY-CONDUCTIVE METALLIC CONNECTORS

(71) Applicants: Ronald Steven Cok, Rochester, NY (US); James Edward Sutton, Rochester, NY (US)

(72) Inventors: Ronald Steven Cok, Rochester, NY (US); James Edward Sutton, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/538,114

(22) Filed: Nov. 11, 2014

(65) Prior Publication Data

US 2016/0132146 A1 May 12, 2016

(51) Int. Cl.
   G06F 3/045 (2006.01)
   G06F 3/044 (2006.01)
   G06F 1/16 (2006.01)

(52) U.S. Cl.
   CPC ........ *G06F 3/044* (2013.01); *G06F 1/16* (2013.01); *G06F 2203/04112* (2013.01)

(58) Field of Classification Search
   CPC .................. G06F 1/16; G06F 2203/04112
   USPC .......................................... 345/174
   See application file for complete search history.

(56) References Cited

U.S. PATENT DOCUMENTS

| | | |
|---|---|---|
| 8,179,381 B2 | 5/2012 | Frey et al. |
| 2010/0139960 A1 | 6/2010 | Ahn et al. |
| 2010/0144407 A1 | 6/2010 | Okumura et al. |
| 2011/0260741 A1 | 10/2011 | Weaver et al. |
| 2011/0289771 A1 | 12/2011 | Kuriki |
| 2011/0308846 A1 | 12/2011 | Ichiki |
| 2012/0073124 A1 | 3/2012 | Chien et al. |
| 2014/0054076 A1 | 2/2014 | Cheng et al. |
| 2014/0209259 A1 | 7/2014 | Li et al. |
| 2014/0209355 A1 | 7/2014 | Lebens et al. |
| 2014/0209357 A1 | 7/2014 | Lebens et al. |
| 2014/0209358 A1 | 7/2014 | Lebens et al. |

*Primary Examiner* — Gustavo Polo
(74) *Attorney, Agent, or Firm* — J. Lanny Tucker

(57) ABSTRACT

Electrically-conductive articles are prepared to have electrically-conductive metallic grids and electrically-conductive metallic connectors (BUS lines) on one or both supporting sides of a transparent substrate. The electrically-conductive metallic connectors are designed with one metallic main wire that comprises two or more adjacent metallic micro-wires in bundled patterns. These bundled patterns and metallic micro-wires are designed with specific dimensions and configurations to provide optimal fidelity (or correspondence) to the mask image used to provide such patterns. The electrically-conductive articles can be prepared using various manufacturing technologies and can be used as parts of various electronic devices including touch screen devices. The electrically-conductive metallic grids and connectors can be prepared and designed using various technologies that are amenable to obtaining very fine lines in predetermined patterns.

21 Claims, 10 Drawing Sheets

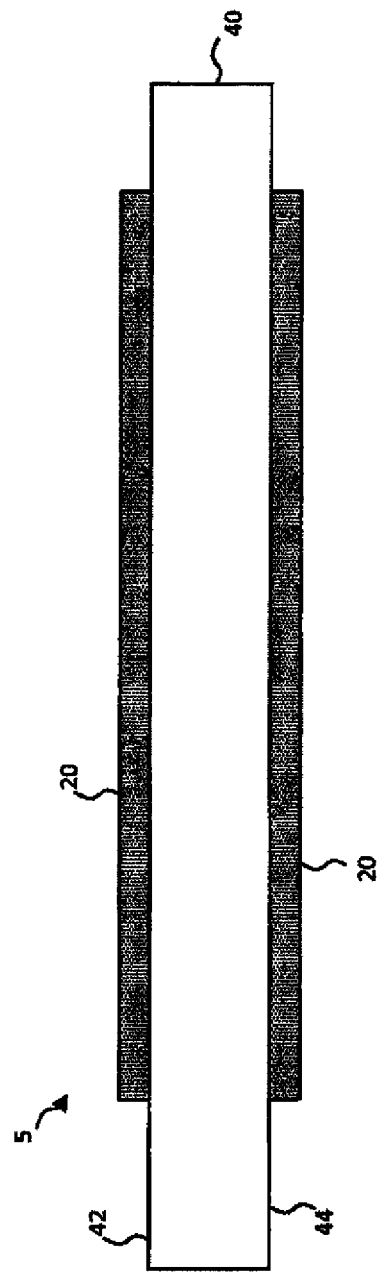

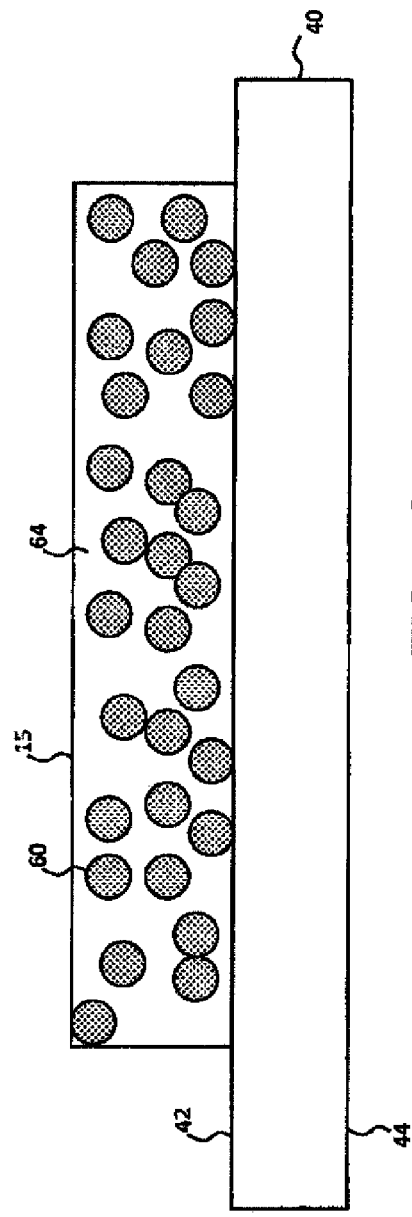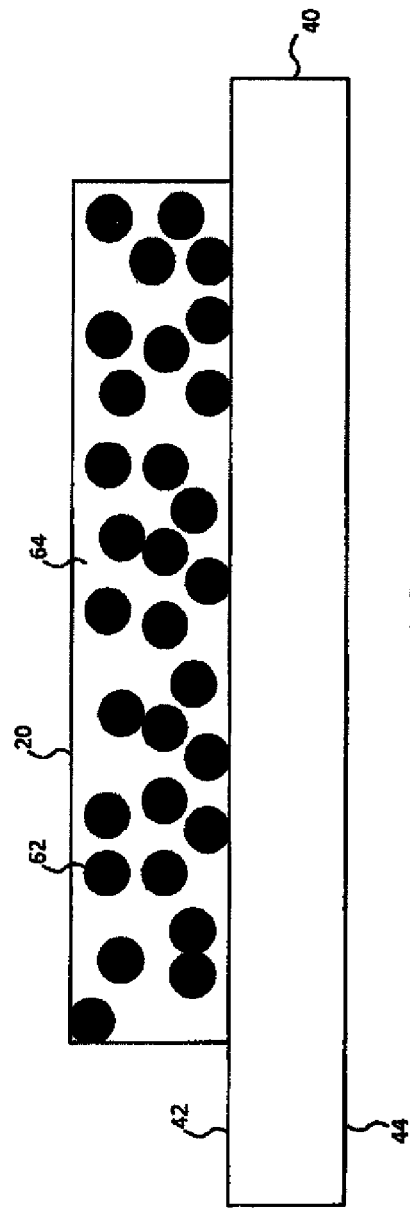

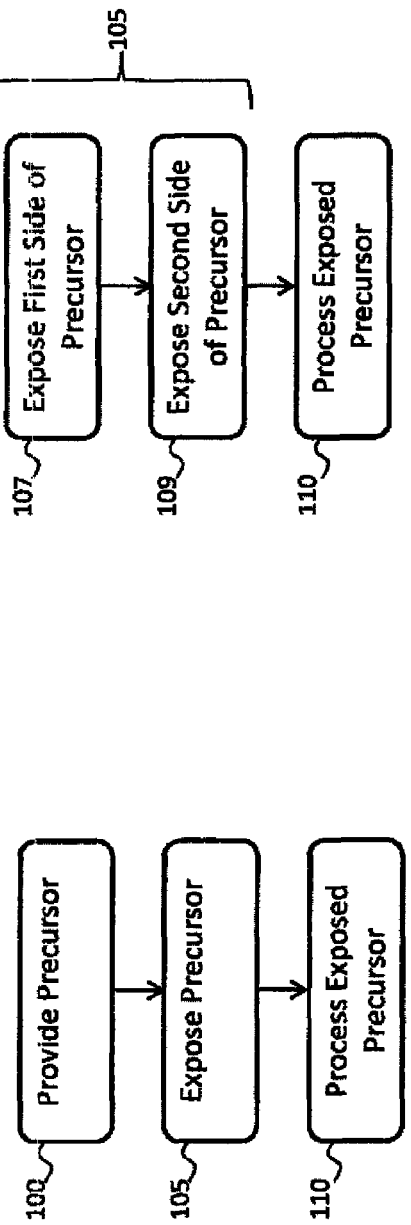
FIG. 7
FIG. 6
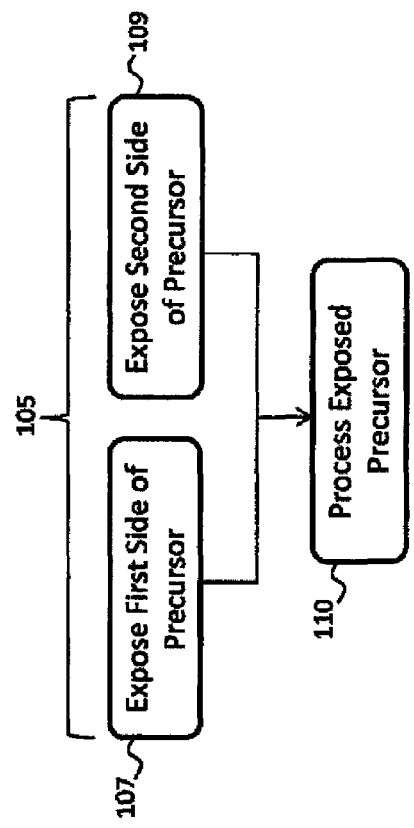
FIG. 8

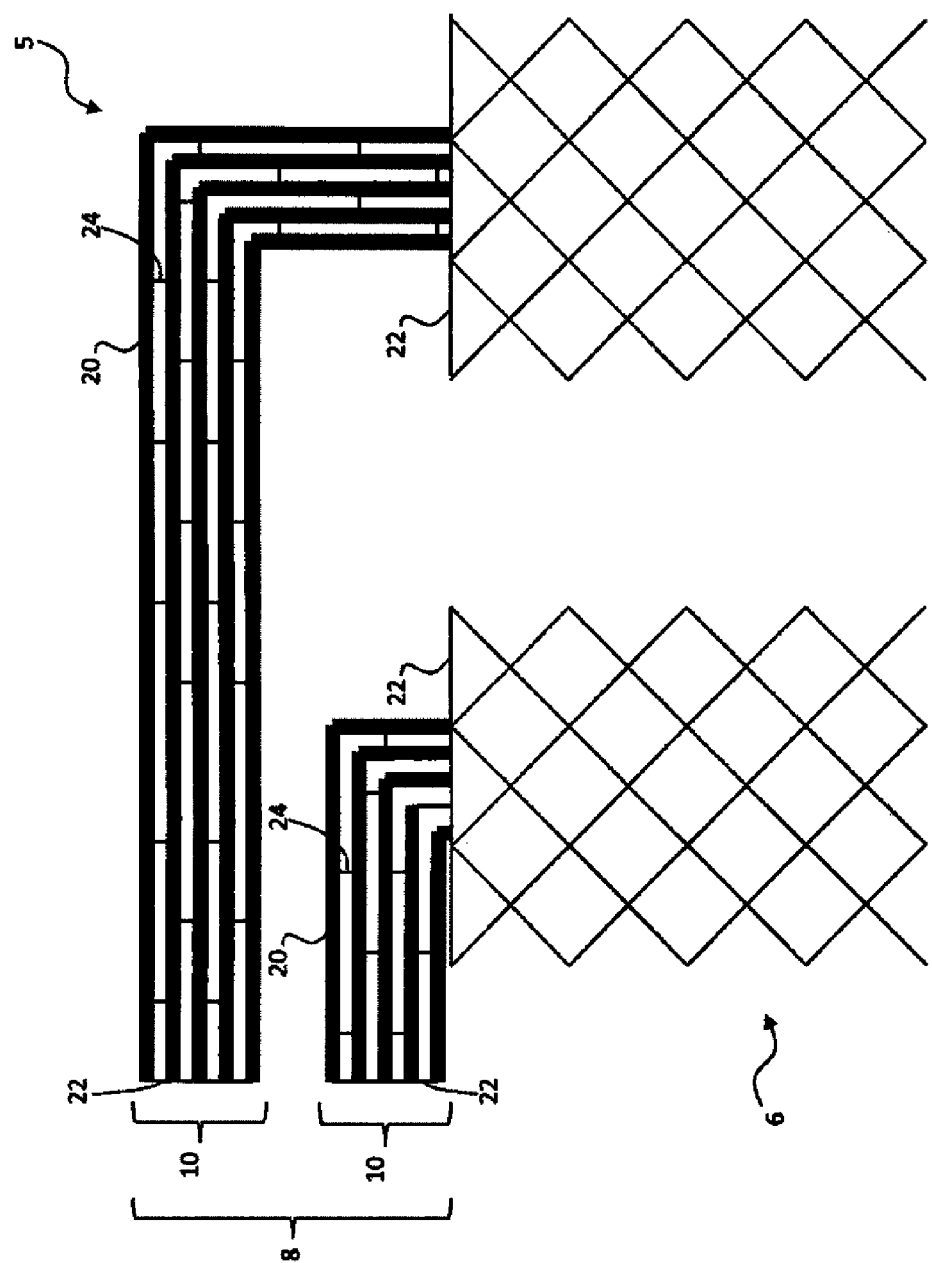

ELECTRICALLY-CONDUCTIVE ARTICLES WITH ELECTRICALLY-CONDUCTIVE METALLIC CONNECTORS

RELATED APPLICATIONS

Reference is made to the following copending and commonly assigned patent applications, the disclosures of all of which are incorporated herein by reference:

U.S. Ser. No. 13/964,453 (filed Aug. 12, 2013 by Lebens and Cok, and, issued as U.S. Pat. No. 9,131,606);

U.S. Ser. No. 14/166,910 (filed Jan. 29, 2014 by Kenneth Lushington);

U.S. Ser. No. 14/281,923 (filed May 20, 2014 by Lushington, Cok, and Sutton);

U.S. Ser. No. 14/281,953 (filed 20, 2014 by Cok, Sutton, and Lushington); and

U.S. Ser. No. 14/538,102 filed Nov. 11, 2014 by Cok and Sutton and entitled "Providing Electrically-Conductive Articles with Electrically-Conductive Metallic Connectors."

FIELD OF THE INVENTION

This invention relates to transparent electrically-conductive articles having electrically-conductive metallic electrode grids and electrically-conductive metallic connectors connected thereto. Such electrically-conductive articles have specifically arranged electrically-conductive metallic (fine wire) grids in a touch region and electrically-conductive metallic connectors in a non-touch region on a transparent substrate.

BACKGROUND OF THE INVENTION

Rapid advances are occurring in various electronic devices especially display devices that are used for various communicational, financial, and archival purposes. For such uses as touch screen panels, electrochromic devices, light-emitting diodes (LED's), field-effect transistors, solid-state illumination, organic light-emitting diode (OLED) displays, and liquid-crystal displays, electrically-conductive films are essential and considerable efforts are being made in the industry to improve the properties of those electrically-conductive films and particularly to improve metal grid or line conductivity and to provide as much correspondence between mask design with resulting user metal patterns.

Electrically-conductive articles used in various electronic devices including touch screens in electronic, optical, sensory, and diagnostic devices including but not limited to telephones, computing devices, and other display devices have been designed to respond to touch by a human fingertip or mechanical stylus.

There is a particular need to provide touch screen displays and devices that contain improved electrically-conductive film elements. Currently, capacitive touch screen displays use Indium Tin Oxide (ITO) coatings to create arrays of capacitive areas used to distinguish multiple points of contacts. ITO coatings have significant disadvantages and efforts are being made to replace their use in various electronic devices.

In known printed circuit board (PCB) and integrated circuit manufacture processes, the preferred means for mass manufacture is to print a circuit directly from a master article onto a suitable substrate, to create a copy of the circuit image on a suitable PCB photosensitive film, or to directly laser-write a master circuit image (or inverse pattern) onto the PCB photosensitive film. The imaged PCB photosensitive film is then used as a "mask" for imaging multiple copies onto one or more photoresist-coated substrates.

An essential feature of these methods is that the PCB photosensitive film and photoresist compositions are optimized in formulation and development so that the imaged copies are as faithful a representation of the master image as possible with respect to circuit dimensions and properties. This property is sometimes referred to as "fidelity" (or "correspondence") and the worse the fidelity, the poorer the performance of the resulting copies. However, in mass production of these electrical circuits having designed patterns with very fine dimensional features, there are a number of compositional and operational (for example, chemical processing) conditions that naturally work against fidelity, or making faithful reproductions of the master circuit image.

Electrically-conductive silver articles have been described for use in touch screen panels that have electrically-conductive silver grid patterns on both sides of a transparent substrate, for example as in U.S. Patent Application Publications 2011/0289771 (Kuriki) and 2011/0308846 (Ichiki).

However, the mere presence of electrically-conductive silver grid patterns on one or both sides of the transparent substrate is not sufficient to provide a response that is needed for sensing touch for various electronic devices. The electrically-conductive metallic grids must be connected in some manner to each other and to suitable electronic components and software in the devices so that desired functions can be accomplished in response to a touch from a finger or stylus. Thus, electrically-conductive articles are also designed with electrically-conductive "BUS" lines (or electrically-conductive connectors or terminal wiring regions) that are outside the electrically-conductive touch regions designed for touching. One representation of such an electrically-conductive article is shown in FIG. 8 of U.S. Patent Application 2011/0289771 (noted above).

Normally, the electrically-conductive metallic connector in the electrically-conductive article is not designed for high transparency or sensitivity to touch. It will likely have different conductivity and dimensions compared to the electrically-conductive metallic grid in the touch regions. These differences further make it harder to achieve desired fidelity of a master circuit image and copies made therefrom.

Known low-cost methods for making fine wires suitable for apparently-transparent touch regions designed for touching are not always adaptable to making large and thick wires that are suitable for BUS lines used in electrically-conductive metallic connectors or terminal wiring regions that are outside the electrically-conductive touch regions containing electrically-conductive metallic grids. Using different manufacturing methods for each of such regions is costly and prone to various problems.

Thus, there is a need for transparent electrically-conductive articles that have both electrically-conductive metallic grids in touch sensitive regions as well as electrically-conductive metallic connector that are as close to being reproductions to the master circuit image as possible.

SUMMARY OF THE INVENTION

The present invention provides an electrically-conductive article comprising transparent substrate having a first supporting side and an opposing second opposing side, and comprising on the first supporting side:

(a) an electrically-conductive metallic grid, (b) an electrically-conductive metallic connector that is electrically connected to the electrically-conductive metallic grid, and optionally, (c) transparent regions outside of both the electrically-conductive metallic grid and the electrically-conductive metallic connector, wherein:

(i) the electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;

(ii) the average length of each metallic micro-wire is at least 1 mm; and (iii) the electrically-conductive metallic connector has an integrated transmittance of less than 68%.

In many embodiments, the electrically-conductive article further comprises:

on the opposing second supporting side of the transparent substrate:

(a) an opposing electrically-conductive metallic grid, (b) an opposing electrically-conductive metallic connector that is electrically connected to the opposing electrically-conductive metallic grid, and optionally, (c) transparent regions outside of both the opposing electrically-conductive metallic grid and the opposing electrically-conductive metallic connector, wherein:

(i) the opposing electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;

(ii) the average length of each metallic micro-wire is at least 1 mm; and (iii) the opposing electrically-conductive metallic connector has an integrated transmittance of less than 68%.

One or more electrically-conductive articles of this invention can be used to manufacture various touch screen devices.

The present invention provides electrically-conductive articles that comprise electrically-conductive metallic grids (for the "touch sensitive" or "touch" regions) having a higher transparency and higher conductivity. Such electrically-conductive articles also comprise electrically-conductive metallic connectors (also identified as BUS lines, BUS regions, or terminal electrodes) with improved matching (correspondence or fidelity) of the images of these regions to the images in the original mask element and higher conductivity. The electrically-conductive metallic lines in both regions can be made in a common procedure (or step) using common materials.

The advantages are achieved for the electrically-conductive metallic wire patterns in the (electrode) connector regions by arranging at least one metallic (such as silver) main wire (for example, two or more metallic main wires) into bundled patterns of two or more metallic micro-wires and various metallic (such as silver) end wires for each bundled pattern. In addition, adjacent metallic micro-wires in the bundled pattern can be arranged with both electrically-connecting metallic (such as silver) cross-wires and metallic (such as silver) end wires. The bundled patterns and metallic micro-wires are obtained from exposure and processing with specific dimensions, spacing, and conductive properties for optimal performance in touch screen devices. The bundled patterns of metallic main wires and metallic micro-wires increase electrical conductivity, manufacturability, and robustness even in the presence of some manufacturing defects. In other words, the possible effects of manufacturing defects or inconsistencies are at least reduced while providing the present invention.

BRIEF DESCRIPTION OF THE DRAWINGS

FIG. 2 is a schematic cross-sectional view of an electrically-conductive article of the present invention.

FIG. 3A is a schematic cross-sectional view of a conductive film element precursor comprising a portion of a photosensitive silver halide emulsion layer disposed on a transparent substrate, which portion of photosensitive silver halide emulsion layer comprises non-developed photosensitive silver halide grains.

FIG. 3B is a schematic cross-sectional view of a conductive film element precursor comprising developed photosensitive silver halide grains in a representative silver micro-wire disposed on a transparent substrate, which silver micro-wire can be obtained from the portion of photosensitive silver halide emulsion layer shown in FIG. 3A.

FIGS. 6 to 9 are flow charts showing options for forming electrically-conductive articles from single-sided or duplex conductive film element precursors.

FIG. 12 is a schematic illustration of an electrically-conductive article according to at least one embodiment of the present invention.

DETAILED DESCRIPTION OF THE INVENTION

Figure 1:
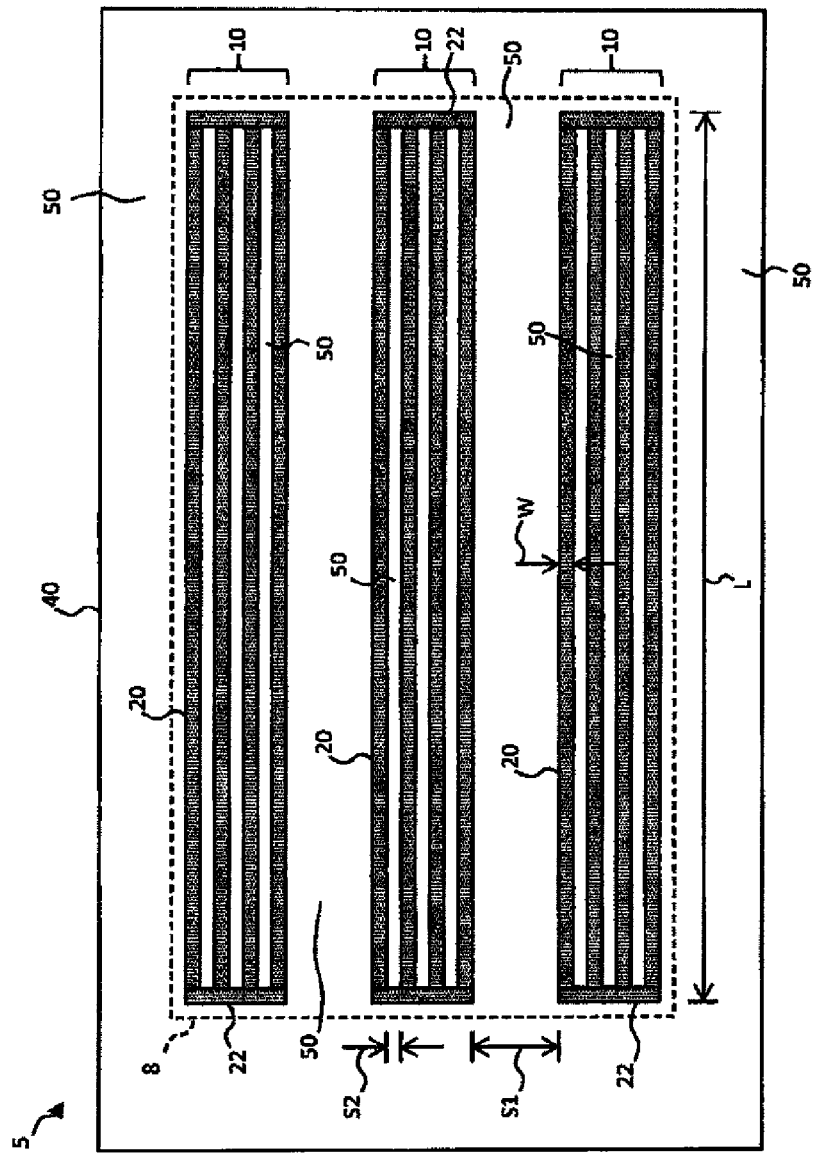
FIG. 1 is a schematic illustration of an electrically-conductive metallic connector wire pattern shown on one supporting side of a transparent substrate, which electrically-conductive metallic connector wire pattern can be incorporated into or part of an electrically-conductive article prepared using this invention.

The following discussion is directed to various embodiments of the present invention and while some embodiments can be more desirable for specific uses, the disclosed embodiments should not be interpreted or otherwise considered to be limiting the scope of the present invention, as claimed below. Thus, one skilled in the art should understand that the following disclosure and illustrative FIGS. have broader application than is explicitly described and the discussion or illustration of an embodiment is not intended to limit the scope of the present invention.

DEFINITIONS

As used herein to define various components and structures of the electrically-conductive articles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard printed dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the term "weight %" refers to the amount of a component or material based on the total solids of a composition, formulation, solution, or the % of the dry weight of a layer. Unless otherwise indicated, the percentages can be the same for either a dry layer or pattern, or for the total solids of the formulation or composition used to make that layer or pattern.

Unless otherwise indicated, the terms "electrically-conductive film element" and "electrically-conductive article" are intended to mean the same thing. They refer to the materials containing the electrically-conductive metallic grids and electrically-conductive metallic connectors disposed on either or both supporting sides of a suitable transparent substrate. Other components of the electrically-conductive articles are described below.

The term "first" refers to the layers on one (first planar) supporting side of the transparent substrate and the term "second" refers to the layers on the opposing (opposite planar) second supporting side of the transparent substrate. Each supporting side of the transparent substrate can be equally useful and the term "first" does not necessarily mean that one side is the primary or better supporting side of the electrically-conductive article.

The terms "duplex" and "two-sided" are used herein in reference to electrically-conductive articles having the described electrically-conductive metallic grids and electrically-conductive metallic connectors on both supporting sides of the transparent substrate.

ESD refers to "equivalent spherical diameter" and is a term used in the photographic art to define the size of particles such as silver halide grains. Particle size of silver halide grains as expressed in grain ESD can be readily determined using disc centrifuge instrumentation.

Unless otherwise indicated, "black-and-white" refers to silver-forming black-and-white materials and formulations, and not chromogenic black-and-white materials and formulations.

In most embodiments, the electrically-conductive articles, including the transparent substrate and all accompanying electrically-conductive metallic grids, and transparent regions on one or both supporting sides, are considered transparent meaning that its integrated transmittance over the noted visible region of the electromagnetic spectrum (for example from 410 nm to 700 nm) is 70% or more, or more likely at least 85% or even 90% or more, as measured for example using a spectrophotometer and known techniques. Thus, the touch regions in the resulting electrically-conductive articles will have this high integrated transmittance.

However, the regions containing the electrically-conductive connectors are generally much less transparent than the rest of the electrically-conductive articles and generally have an integrated transmittance of less than 68%, or less than 50%, or even less than 40% using the same equipment and procedures noted above.

Alternatively, the integrated transmittance can be associated with the calculated percentage of the transparent substrate area that is not covered by either the electrically-conductive metallic grid in the touch region or by the electrically-connected metallic connector in the connector region.

In defining various dimensions of the metallic (such as silver) main wires and metallic (such as silver) micro-wires provided in the conductive articles, each dimension "average" is determined from at least 2 measurements of the specific dimension using appropriate measurement techniques and equipment that would be known to one skilled in the art.

Unless otherwise indicated, the terms "connector," "BUS lines," and "BUS regions" mean the same thing.

Unless otherwise indicated herein, the term "metallic" refers to materials that are single pure metals, metal alloys, metallic oxides, metallic sulfides, composites of a metal with organic or inorganic materials, and materials containing metallic particles such as micro-particles, nano-particles, or grains.

Uses

The electrically-conductive articles have various uses. For example, the electrically-conductive articles can be used as devices themselves or they can be used as components in devices having a variety of applications including but not limited to, electronic, optical, sensory, and diagnostic uses. In particular, it is desired to use the conductive film element precursors to provide highly electrically-conductive metallic grids and electrically-conductive metallic connector comprising metallic lines having suitable height, width, and conductivity for use in touch screen displays or as components of touch-screen devices. Such electronic and optical devices and components include but are not limited to, radio frequency tags (RFID), sensors, touch-screen displays, and memory and back-panels for displays.

Electrically-Conductive Articles

The electrically-conductive articles of this invention comprise a transparent substrate having a first supporting side and an opposing second supporting side. These opposing supporting sides refer to the planar sides of the transparent substrate as opposed to its edges.

The choice of a transparent substrate generally depends upon the intended utility of the resulting electrically-conductive article for a predetermined device. The transparent substrate can be rigid or flexible, and generally has an integrated transmittance of at least 90% and generally at least 95% over the visible region of the electromagnetic spectrum (for example at least 410 nm and up to and including 700 nm). Integrated transmittance can be determined using a spectrophotometer and known procedures as described above.

Suitable transparent substrates include but are not limited to, glass, glass-reinforced epoxy laminates, cellulose triacetate, acrylic esters, polycarbonates, adhesive-coated polymer transparent substrates, polyester films, and transparent composite materials. Suitable transparent polymers for use as transparent polymer substrates include but are not limited to, polyethylene and other polyolefins, polyesters such as polyethylene terephthalate (PET), polyethylene naphthalate (PEN), poly-1,4-cyclohexanedimethylene terephthalate, poly(butylene terephthalate), and copolymers thereof, polypropylenes, polyvinyl acetates, polyurethanes, polyamides, polyimides, polysulfones, polycarbonates, and mixtures thereof. Other useful transparent substrates can be composed of cellulose derivatives such as a cellulose ester, cellulose triacetate, cellulose diacetate, cellulose acetate propionate, cellulose acetate butyrate, polyacrylates, polyether imides, and mixtures thereof.

Transparent polymeric substrates can also comprise two or more layers of the same or different polymeric composition so that the composite transparent substrate (or laminate) has the same or different layer refractive properties. The transparent substrate can be treated on either or both supporting sides to improve adhesion of any disposed layers or patterns. For example, the transparent substrate can be coated with a polymer adhesive layer, can be chemically treated, or subjected to a corona treatment, on one or both supporting sides.

Commercially available oriented and non-oriented transparent polymer films, such as biaxially-oriented polypropylene or polyester, can be used. Such transparent substrates can contain pigments, air voids or foam voids as long as desired integrated transmittance is obtained. The transparent substrate can also comprise microporous materials such as polyethylene polymer-containing material sold by PPG Industries, Inc., Pittsburgh, Pa. under the trade name of Teslin®, Tyvek® synthetic paper (DuPont Corp.). The transparent substrate also can be voided, which means it contains voids formed as interstitial voids using added solid and liquid materials, or "voids" containing a gas. Some commercial microvoided products are commercially available as 350K18 from ExxonMobil and KTS-107 (from HSI, South Korea).

Biaxially-oriented sheets, while described as having at least one layer, can also be provided with additional layers that can serve to change the optical or other properties of the biaxially-oriented sheet. Such layers might contain tints, antistatic or conductive materials, or slip agents.

Flexible transparent substrates for the manufacture of flexible electronic devices or touch screen components facilitate rapid roll-to-roll manufacture. Estar® poly(ethylene terephthalate) films and cellulose triacetate films are particularly useful materials for making flexible transparent substrates.

The transparent substrate can have a thickness of at least 20 µm and up to and including 300 µm or typically at least 75 µm and up to and including 200 µm. Antioxidants, brightening agents, antistatic or conductive agents, plasticizers, and other known additives can be incorporated into the transparent substrate, if desired, in amounts that would be readily apparent to one skilled in the art as long as desired integrated transmittance is preserved.

The electrically-conductive article can have on at least the first supporting side of the transparent substrate:

(a) an electrically-conductive metallic (such as silver) grid, (b) an electrically-conductive metallic (such as silver) connector that is electrically connected to the electrically-conductive metallic grid, and optionally, (c) transparent regions outside of both the electrically-conductive metallic grid and the electrically-conductive metallic connector, wherein:

(i) the electrically-conductive metallic connector comprises at least one metallic (such as silver) main wire that comprises two or more metallic (such as silver) micro-wires that are electrically connected to a metallic end wire at an end of the at least one metallic main wire, the two or more metallic micro-wires and the metallic end wire in the at least one metallic main wire forming a bundled pattern;

(ii) the average length of each metallic micro-wire is at least 1 mm; and (iii) the electrically-conductive metallic connector has an integrated transmittance of less than 68%.

The electrically-conductive articles, including the transparent substrate and all accompanying layers on one or both supporting sides, are considered transparent in the touch regions in which the electrically-conductive metallic grids are formed, and other transparent regions outside the electrically-conductive metallic grid and the electrically-conductive metallic connector, meaning that the integrated transmittance over the visible region of the electromagnetic spectrum (for example from 410 nm to 700 nm) through the entire electrically-conductive article in these touch regions and other transparent regions is 70% or more, or more likely at least 85%, or even 90% or more. Integrated transmittance is measured as described above.

However, the electrically-conductive metallic connector is less transparent due to the higher coverage of metallic material formed in those connector regions. For example, such electrically-conductive metallic connectors are comprised of electrically-conductive metallic patterns generally have an integrated transmittance of less than 68%, or less than 50%, or even less than 40%.

The electrically-conductive metallic grids and electrically conductive metallic connectors can be formed on a suitable transparent substrate in various procedures as described below. The various essential and optional features (i) through (v) are also described below. While the following discussion is directed primarily to the use of photosensitive silver halide to carry out the present invention, it is to be understood that the inventive methods described herein to prepare the inventive electrically-conductive articles are not limited to this particular technology. Once a skilled artisan understands the desired features for the electrically-conductive articles from the teaching herein, it would be readily apparent to that skilled artisan how to use various chemical and materials technologies to achieve the desired result.

Technologies for Providing Electrically-Conductive Articles

The electrically-conductive articles of the present invention can be prepared in various ways, including the use of precursor articles comprising silver halide emulsions that can be imaged through a suitable mask to form electrically-conductive silver metal patterns (described in detail below), the use of "emboss and fill" technologies, and the use of compositions (for example, photocurable compositions) that can be printed in patterns (for example photocurable patterns) that are electrically-conductive as printed (for example, as an electrically-conductive ink) or that can be subsequently electrolessly plated to form electrically-conductive patterns.

"Emboss and Fill" Technology:

"Emboss and fill" technology typically involves forming micro-wire patterns on a transparent substrate using imprinting processes such as imprint lithography. For example, conductive micro-wires can be formed in micro-channels that have been embossed or imprinted into a photocurable composition on a substrate such as a material described below. A pattern of micro-channels can be embossed (impressed) onto the photocurable composition layer by a master (or mold) having a reverse pattern of ridges formed on its surface. The impressed photocurable composition can be then cured by light before the master (mold) is released. An additional heat curing step can be used to further cure the composition. A conductive composition can be coated over the substrate, flowing into the formed micro-channels. It is usually desirable to remove excess conductive composition between micro-channels for example by wiping. The conductive composition remaining in the micro-channels can be cured for example by heating and exposure to hydrochloric acid vapor. The micro-channels are provided and filled to form both electrically-conductive metallic grids and electrically-conductive metallic connectors in common steps. Excess cured conductive composition can then be removed using known treatments.

Some useful procedures and compositions for preparing electrically-conductive articles using this technology are described for example, in copending and commonly assigned U.S. Ser. No. 14/017,638 (filed Sep. 4, 2013 by Wang et al.), Ser. No. 14/017,707 (filed Sep. 4, 2013 by Wang et al.), and Ser. No. 14/094,841 (filed Dec. 3, 2013 by Wang et al., K001638/JLT), the disclosures of all of which are incorporated herein by reference. Useful photocurable compositions in such procedures include one or more epoxysilanes such as epoxysilane oligomers, one or more acid-generating compounds such onium salts, and one or more multifunctional epoxy compounds with sufficient epoxy groups to provide efficient curing with the acid-generating compounds.

Additional Photocurable Technology:

Some other useful photocurable compositions and their use to prepare electrically-conductive articles (including transparent continuous rolls of such articles) are described, for example in WO 2013/062630 (Petcavich) and WO 2013/063051 (Petcavich et al.).

As used herein, the term "photocuring" means the polymerization of functional oligomers and monomers, or even polymers, into a crosslinked polymer network, in response to irradiation of such materials, for example irradiation using ultraviolet (UV), visible, or infrared radiation at a suitable wavelength.

The term "photocurable" is used to define a material (or component) that will polymerize or crosslink when irradiated with suitable radiation, for example irradiated with radiation such as ultraviolet (UV), visible, or infrared radiation in an appropriate environment.

The term "polymerization" is used herein to mean the combining, for example by covalent bonding, of a large number of smaller molecules, such as monomers, to form very large molecules, that is, macromolecules or polymers. The monomers can be combined to form only linear macromolecules or they can be combined to form three-dimensional macromolecules that are commonly referred to as crosslinked polymers. One type of polymerization that can be carried out in the practice of this invention is acid-catalyzed (cationic) polymerization. Another type of polymerization is free radical polymerization when free radically polymerizable materials and suitable free radical generating photoinitiators are present. In some useful embodiments, both acid-catalyzed polymerization and free radically polymerization can be used simultaneously.

For example, the electrically-conductive metallic grids and electrically-conductive metallic connectors can be formed on one or both supporting sides of the transparent substrates using photocurable compositions that can provide seed metal catalysts for electroless plating processes. For example, the photocurable compositions can comprise acid-catalyzed photocurable chemistry, free radical photocurable chemistry, or both types of chemistry, but the present invention is not limited to the described photocurable chemistries.

In some embodiments, useful photocurable compositions comprise one or more UV-curable components at least one of which is an acid-catalyzed photocurable component. Such photocurable compositions can further comprise a photoacid generator that participates in the generation of acid radicals that cause photocuring of photocurable components.

Some useful acid-catalyzed photocurable components are photocurable epoxy materials. Cationically photocurable epoxy materials can be organic compounds having at least one oxirane ring, which oxirane ring is shown in the following formula:

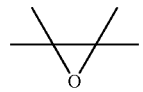

that is polymerizable (photocurable) by a ring opening mechanism. Such epoxy materials include monomeric epoxy compounds and epoxides of the polymeric type and can be aliphatic, cycloaliphatic, aromatic or heterocyclic. These materials generally have, on the average, at least one polymerizable epoxy group per molecule, or typically at least about 1.5 or even at least about 2 polymerizable epoxy groups per molecule. Polymeric epoxy materials include linear polymers having terminal epoxy groups (for example, a diglycidyl ether of a polyoxyalkylene glycol), polymers having skeletal (backbone) oxirane units (for example, polybutadiene polyepoxide), and polymers having pendant epoxy groups (for example, a glycidyl methacrylate polymer or copolymer).

Various compounds can be used as photoacid generators to generate a suitable acid to participate in the photocuring of the epoxy materials. Some of these "photoacid generators" are acidic in nature and others are nonionic in nature. Other useful photoacid generators besides those described below would be readily apparent to one skilled in the art in view of the teaching provided herein.

Onium salt acid generators useful as photoacid generators include but are not limited to, salts of diazonium, phosphonium, iodonium, or sulfonium salts including polyaryl diazonium, phosphonium, iodonium, and sulfonium salts. The iodonium or sulfonium salts include but not limited to, diaryliodonium and triarylsulfonium salts. Useful counter anions include but are not limited to complex metal halides, such as tetrafluoroborate, hexafluoroantimonate, trifluoromethanesulfonate, hexafluoroarsenate, hexafluorophosphate, and arenesulfonate. The onium salts can also be oligomeric or polymeric compounds having multiple onium salt moieties as well as molecules having a single onium salt moiety.

Useful iodonium salts can be simple salts (for example, containing an anion such as chloride, bromide, iodide, or $C_4H_5SO_3^-$) or a metal complex salt (for example, containing $SbF_6^-$, $PF_6^-$, $BF_4^-$, tetrakis(perfluorophenyl)borate, or $SbF_5OH_{31}AsF_6^-$). Particularly useful sulfonium salts include but are not limited to, triaryl-substituted salts such as mixed triarylsulfonium hexafluoroantimonates (for example, commercially available as UVI-6974 from Dow Chemical Company), mixed triarylsulfonium hexafluorophosphates (for example, commercially available as UVI-6990 from Dow Chemical Company), and arylsulfonium hexafluorophosphates (for example, commercially available as SarCa™ KI85 from Sartomer Company).

Nonionic photoacid generators are also useful in present invention, which compounds include but are not limited to, diazomethane derivatives, glyoxime derivatives, bissulfone derivatives, and disulfono derivatives.

Some photocurable compositions described herein, especially those containing photopolymerizable epoxy materials and photoacid generators, can contain one or more electron donor photosensitizers to improve photocuring efficiency. Useful electron donor photosensitizers should be soluble in the photocurable composition, free of functionalities that would substantially interfere with the cationic photocuring process, and capable of light absorption (sensitivity) within the range of wavelengths of at least 150 nm and up to and including 1000 nm. Suitable electron donor photosensitizers initiate the chemical transformation of an onium salt (or other photoacid generator) in response to the photons absorbed from the irradiation. The electron donor photosensitizer should also be capable of reducing the photoacid generator after the electron donor photosensitizer has absorbed light (that is, photoinduced electron transfer). Thus, the electron donor photosensitizer, upon absorption of photons from irradiation, is generally capable of donating an electron to the photoacid generator.

In general, many different classes of compounds can be used as electron donor photosensitizers for various reactants. Useful electron donor photosensitizers include but are not limited to, aromatics such as naphthalene, 1-methylnaphthalene, anthracene, 9,10-dimethoxyanthracene, benz[a]anthracene, pyrene, phenanthrene, benzo[c]phenanthrene, and fluoranthene. Other useful electron donor photosensitizers that involve the triplet excited state are carbonyl compounds such as thioxanthones and xanthones. Ketones including aromatic ketones such as fluorenone, and coumarin dyes such as ketocoumarins such as those with strong electron donating moieties (such as dialkylamino) can also be used as electron donor photo sensitizers. Other suitable electron donor photosensitizers are believed to include xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriarylmethanes, merocyanines, squarylium dyes, and pyridinium dyes.

In other embodiments of photocurable technologies, the photocurable compositions can comprise one or more UV-curable components at least one of which is a free radically photocurable component and the photocurable composition can further comprise a free radical photoinitiator to provide free radicals during photocuring.

The one or more free-radically polymerizable compounds can be present to provide free-radically polymerizable functionality, including ethylenically unsaturated polymerizable monomers, oligomers, or polymers such as mono-functional or multi-functional acrylates (also includes methacrylates). Such free-radically polymerizable compounds comprise at least one ethylenically unsaturated polymerizable bond (moiety) and they can comprise two or more of these unsaturated moieties in many embodiments. Suitable materials of this type contain at least one ethylenically unsaturated polymerizable bond and are capable of undergoing addition (or free radical) polymerization. Such free radically polymerizable materials include mono-, di-, or poly-acrylates and methacrylates.

One or more free radical photoinitiators can also be present in the photocurable compositions to generate free radicals. Such free radical photoinitiators include any compound that is capable of generating free radicals upon exposure to photocuring radiation such as ultraviolet or visible radiation. For example, free radical photoinitiators can be selected from triazine compounds, thioxantone compounds, benzoin compounds, carbazole compounds, diketone compounds, sulfonium borate compounds, diazo compounds, benzophenone compounds, and biimidazole compounds, and others that would be readily apparent to one skilled in the art.

The photocurable compositions described herein generally include suitable metallic particles that can act as seed metal catalytic sites for electroless plating. Usually only one type of metal particles are used, but it is also possible to include mixtures of metallic particles, from the same or different classes of metals, that do not interfere with each other.

Useful metallic particles can be chosen from one or more classes of noble metals, semi-noble metals, Group IV metals, or combinations thereof. Useful noble metal particles include but are not limited to, particles of gold, silver, palladium, platinum, rhodium, iridium, rhenium, mercury, ruthenium, and osmium. Useful particles of semi-noble metals include but are not limited to, particles of iron, cobalt, nickel, copper, carbon, aluminum, zinc, and tungsten. Useful particles of Group IV metals include but are not limited to particles of tin, titanium, and germanium. The noble metal particles such as particles of silver, palladium, and platinum are particularly useful, and the semi-noble particles of nickel and copper are also particularly useful. Tin particles are particularly useful in the Group IV metal class. In many embodiments, silver or copper particles are used in the photocurable composition.

The metallic particles can be dispersed in various organic solvents and can have improved dispersibility in the presence of the other components of the photocurable composition. Useful dispersants are known in the art and can also be present if desired. The methods used to disperse the metal particles include but are not limited to, ball-milling, magnetic stirring, high speed homogenization, high pressure homogenization, and ultrasonication.

The metallic particles can be present in the photocurable compositions as individual particles, but in many embodiments, the metal particles are present as agglomerations of two or more metal particles. Such metallic particles can be present in any geometric shape including but not limited to, spheres, rods, prisms, cubes, cones, pyramids, wires, flakes, platelets, and combinations thereof, and they can be uniform or non-uniform in shapes and sizes.

When carbon-coated metal particles are used, they can be designed to have a median particle diameter that is equal to or less than 0.6 µm, or less than 0.2 µm, or more likely less than 0.1 µm. Such carbon-coated metal particles generally have a minimum median diameter 0.005 µm. Median particle diameter [Dv (50%)] can be determined using a dynamic light scattering method. For example, such a method can be carried out using a Malvern Zetasizer Nano ZS that can be obtained commercially from Malvern Instruments, Ltd.

The photocurable compositions are generally provided in a suitable organic diluent that serves as a non-aqueous (organic) solvent or combination of solvents in which the components of the photocurable composition are dissolved or dispersed. In many embodiments, the organic diluent is an organic solvent medium that includes one or more inert organic solvents such as 2-ethoxyethanol, 2-(2-methoxyethoxy)ethanol, 2-(2-ethoxyethoxy)ethanol, 1-methoxy-2-propanol (Dowanol PM), 4-heptanone, 3-heptanone, 2-heptanone, cyclopentanone, cyclohexanone, diethyl carbonate, 2-ethoxyethyl acetate, N-butyl butyrate, acetone, dichloromethane, isopropanol, ethylene glycol, and methyl lactate. By "inert", it is meant that the organic solvents do not appreciably participate in any chemical reactions.

When one or more photocurable components (as described above) are present as liquid organic compounds, those one or more photocurable components can act as the organic diluent and separate inert organic solvents may not be necessary. In such instances, the organic diluent can be considered a "reactive" diluent. Alternatively, one or more reactive diluents can be used in combination with one or more inert organic solvents to form a suitable organic diluent.

While not essential to the photocurable compositions, an optional component is carbon black in an amount of at least 0.5 weight % and up to and including 20 weight % based on the total weight of the photocurable composition.

Photosensitive Silver Halide Technology:

Providing electrically-conductive articles can be accomplished using conductive film element precursors that comprise photosensitive silver halide(s) but they do not generally contain chemistry sufficient to provide color photographic images. Thus, these "precursors" are considered to be black-and-white photosensitive materials forming metallic silver images following exposure and development, and are non-color image-forming.

The precursors can be formed by providing a non-color (that is, silver image-forming black-and-white) photosensitive silver halide emulsion layer on one or both supporting sides (or planar sides as opposed to non-supporting edges) of a suitable transparent substrate in a suitable manner. Each photosensitive layer comprises a silver halide, or a mixture of silver halides, at a suitable silver coverage, such as a total silver coverage of at least 2500 mg Ag/m$^2$, or at least 3500 mg Ag/m$^2$ but usually less than 5000 mg Ag/m$^2$, for example up to and including 4950 mg Ag/m$^2$. However, higher amounts of silver coverage can be used as would be known in the art. Thus, each photosensitive layer has sufficient silver halide intrinsic or added spectral sensitization to be photosensitive to preselected imaging irradiation (described below). The photosensitive layers can be the same or different in composition and spectral sensitization on the opposing supporting sides of the transparent substrate.

The one or more silver halides are dispersed within one or more suitable hydrophilic binders or colloids as described below.

Such precursors are therefore imagewise exposed and treated (or processed) in such a manner as to convert the silver cations into silver metal particles (such as by reduction), and this treated precursor can then become an electrically-conductive article.

The precursors can have one essential layer on each supporting side of the transparent substrate, which essential layer is a photosensitive silver halide emulsion layer. This essential layer can be disposed on only one supporting side of the transparent substrate, but in many duplex embodiments, it is disposed on both first supporting and opposing second supporting sides of the transparent substrate. Optional layers, such as hydrophilic overcoats and filter dye layers can also be present on either or both supporting sides and are described below but they are not essential to achieve the desired advantages of the present invention.

The silver halide(s) in these layers comprise silver cations of one or more silver halides that can be converted into silver metal particles according to desired patterns upon imagewise exposure of each photosensitive silver halide emulsion layer. Such exposure is generally achieved by imaging through a mask element that is designed with predetermined patterns for both the electrically-conductive metallic electrode grid and the electrically-conductive metallic connector wire pattern. The latent image(s) provided by this exposure can then be developed into desired silver metal image(s) using known silver development procedures and chemistry (described below). The silver halide (or combination of silver halides) is photosensitive, meaning that radiation from UV to visible light (for example, of at least 200 nm and up to and including 750 nm radiation) is generally used to convert silver cations to silver metal particles in a latent image. In some embodiments, the silver halide is present in combination with a thermally-sensitive silver salt (such as silver behenate) and the photosensitive silver halide emulsion layer can be both photosensitive and thermally sensitive (that is, sensitive to thermal imaging energy such as infrared radiation).

The useful photosensitive silver halides can be, for example, silver chloride, silver bromide, silver chlorobromoiodide, silver bromochloroiodide, silver chlorobromide, silver bromochloride, or silver bromoiodide that are prepared as individual compositions (or emulsions). The various halides are listed in the silver halide name in descending order of halide amount. In addition, individual silver halide emulsions can be prepared and mixed to form a mixture of silver halide emulsions that are used on the same or different supporting sides of the transparent substrate. In general, the useful silver halides comprise up to and including 100 mol % of chloride or up to and including 100 mol % of bromide, and up to and including 5 mol % iodide, all based on total silver. These silver halides are generally known as "high chloride" or "high bromide" silver halides and can be used to form "high chloride," or "high bromide" emulsions, respectively.

The silver halide grains used in each photosensitive silver halide emulsion layer generally have an ESD of at least 30 nm and up to and including 300 nm, or more likely at least 50 nm and up to and including 200 nm.

The coverage of total silver in each photosensitive silver halide emulsion layer is desirably at least 2500 mg Ag/m$^2$ and typically at least 3500 mg Ag/m$^2$ and can be less than 5000 mg Ag/m$^2$, although higher amounts can be used.

The dry thickness of each photosensitive silver halide emulsion layer is generally at least 0.5 μm and up to and including 12 μm, and particularly at least 0.5 μm and up to and including 7 μm.

The final dry photosensitive silver halide emulsion layer can be made up of one or more individually coated photosensitive silver halide emulsion sub-layers that can be applied using the same or different silver halide emulsion formulations. Each sub-layer can be composed of the same or different silver halide(s), hydrophilic binders or colloids, and addenda. The photosensitive silver halide emulsion sub-layers can have the same or different amount of silver content.

The photosensitive silver halide(s) used in the photosensitive silver halide emulsion layer on the first supporting side can be the same or different from the photosensitive silver halide(s) used in the opposing second supporting side photosensitive silver halide emulsion layer.

The photosensitive silver halide grains (and any addenda associated therewith as described below) are dispersed (generally uniformly) in one or more suitable hydrophilic binders or colloids to form a hydrophilic silver halide emulsion. Examples of such hydrophilic binders or colloids include but are not limited to, gelatin and gelatin derivatives, polyvinyl alcohol (PVA), polyvinyl pyrrolidone) (PVP), casein, and mixtures thereof. Suitable hydrophilic colloids and vinyl polymers and copolymers are also described in Section IX of Research Disclosure Item 36544, September 1994 that is published by Kenneth Mason Publications, Emsworth, Hants, PO10 7DQ, UK. A particularly useful hydrophilic colloid is gelatin or a gelatin derivative of which several are known in the art.

The amount of hydrophilic binder or colloid in each photosensitive silver halide emulsion layer can be adapted to the particular dry thickness that is desired as well as the amount of silver halide that is incorporated. It can also be adapted to meet desired dispersibility, swelling, and layer adhesion to the transparent substrate. The amount of hydrophilic binder or colloid is generally controlled to maximize the conductivity of the resulting silver metal particles in the conductive articles.

In general, the one or more hydrophilic binders or colloids are present in an amount of at least 10 weight % and up to and including 95 weight %, or more likely at least 10 weight % and up to and including 70 weight %, all based on the total solids in the dry photosensitive silver halide emulsion layer.

Some useful photosensitive silver halide emulsion layer compositions have a relatively high silver ion/hydrophilic binder (for example, gelatin) weight (or volume) ratio. For example, a particularly useful weight ratio of silver ions (and eventually silver metal) to hydrophilic binder or colloid such as gelatin (or its derivative) is at least 0.1:1, or even at least 1.5:1 and up to and including 10:1. A particularly useful weight ratio of silver ions to the hydrophilic binder or colloid can be at least 2:1 and up to and including 5:1. Other weight ratios can be readily adapted for a particular use and dry layer thickness. Particularly useful silver ion/hydrophilic binder (gelatin) volume ratio is less than 0.5:1 or even less than 0.35:1.

The hydrophilic binder or colloid can be used in combination with one or more hardeners designed to harden the particular hydrophilic binder such as gelatin. Particularly useful hardeners for gelatin and gelatin derivatives include but are not limited to, non-polymeric vinyl-sulfones such as bis(vinyl-sulfonyl) methane (BVSM), bis(vinyl-sulfonyl methyl) ether (BVSME), and 1,2-bis(vinyl-sulfonyl acetamide) ethane (BVSAE). Mixtures of hardeners can be used if desired. The hardeners can be incorporated into each photosensitive silver halide emulsion layer in any suitable amount that would be readily apparent to one skilled in the art.

In general, each photosensitive silver halide emulsion layer can be hardened so that it has swell ratio of at least 150% but less than 300% as determined by optical microscopy of element cross-sections, and the swell ratio can be provided by use of appropriate amounts of hardeners within the photosensitive silver halide emulsion layer, or hardeners within various processing solutions (described below).

If desired, the useful silver halides described above can be sensitized to any suitable wavelength of exposing radiation. Organic sensitizing dyes can be used, but it can be advantageous to sensitize the silver salt to the UV portion of the electromagnetic spectrum without using visible light sensitizing dyes to avoid unwanted dye stains if the electrically-conductive article containing the silver metal particles is intended to be transparent. Alternatively, the silver halides can be used without spectral sensitization beyond their intrinsic spectral sensitivities.

Non-limiting examples of addenda that can be included with the silver halides, including chemical and spectral sensitizers, filter dyes, organic solvents, thickeners, dopants, emulsifiers, surfactants, stabilizers, hardeners, and antifoggants are described in Research Disclosure Item 36544, September 1994 and the many publications identified therein. Such materials are well known in the art and it would not be difficult for a skilled artisan to formulate or use such components for purposes described herein. Some useful silver salt emulsions are described, for example in U.S. Pat. No. 7,351,523 (Grzeskowiak), U.S. Pat. Nos. 5,589,318, and 5,512,415 (both to Dale et al.).

Useful silver halide emulsions containing silver halide grains that can be reduced to silver metal particles can be prepared by any suitable method of grain growth, for example, by using a balanced double run of silver nitrate and salt solutions using a feedback system designed to maintain the silver ion concentration in the growth reactor. Known dopants can be introduced uniformly from start to finish of precipitation or can be structured into regions or bands within the silver halide grains. Useful dopants include but are not limited to, osmium dopants, ruthenium dopants, iron dopants, rhodium dopants, iridium dopants, and cyanoruthenate dopants. A combination of osmium and iridium dopants such as a combination of osmium nitrosyl pentachloride and iridium dopant is useful. Such complexes can be alternatively utilized as grain surface modifiers in the manner described in U.S. Pat. No. 5,385,817 (Bell). Chemical sensitization can be carried out by any of the known silver halide chemical sensitization methods, for example using thiosulfate or another labile sulfur compound, alone or in combination with gold complexes.

Useful silver halide grains can be rounded cubic, octahedral, rounded octahedral, polymorphic, tabular, or thin tabular emulsion grains. Such silver halide grains can be regular untwinned, regular twinned, or irregular twinned with cubic or octahedral faces. In one embodiment, the silver halide grains can be rounded cubic having an ESD of less than 0.5 µm and at least 0.05 µm.

Antifoggants and stabilizers can be added to give the silver halide emulsion the desired sensitivity, if appropriate. Useful antifoggants include, for example, azaindenes such as tetraazaindenes, tetrazoles, benzotriazoles, imidazoles and benzimidazoles. Specific antifoggants that can be used include 6-methyl-1,3,3a,7-tetraazaindene, 1-(3-acetamidophenyl)-5-mercaptotetrazole, 6-nitrobenzimidazole, 2-methylbenzimidazole, and benzotriazole, individually or in combination.

The essential silver halide grains and hydrophilic binders or colloids, and optional addenda can be formulated and coated as a silver halide emulsion using suitable emulsion solvents including water and water-miscible organic solvents. For example, useful solvents for making the silver halide emulsion or coating formulation can be water, an alcohol such as methanol, a ketone such as acetone, an amide such as formamide, a sulfoxide such as dimethyl sulfoxide, an ester such as ethyl acetate, liquid or low molecular weight poly (vinyl alcohol), or an ether, or combinations of these solvents. The amount of one or more solvents used to prepare the silver halide emulsions can be at least 30 weight % and up to and including 50 weight % of the total formulation weight. Such coating formulations can be prepared using any of the photographic emulsion making procedures that are known in the art.

While the photosensitive silver halide emulsion layer, on either or both supporting sides of the transparent substrate, can be the outermost layer in the precursor, in many embodiments, there can be a hydrophilic overcoat disposed over each photosensitive silver halide emulsion layer. This hydrophilic overcoat can be the outermost layer in the precursor (that is, there are no layers purposely placed over it on either or both supporting sides of the transparent substrate). If both supporting sides of the transparent substrate comprise a photosensitive silver halide layer, then a hydrophilic overcoat can be present on both supporting sides of the transparent substrate. Thus, a first hydrophilic overcoat is disposed over the first photosensitive silver halide emulsion layer, and a second hydrophilic overcoat is disposed over a second photosensitive silver halide emulsion layer on the opposing second supporting side of the transparent substrate. In most embodiments, each hydrophilic overcoat is directly disposed on each photosensitive silver halide emulsion layer, meaning that there are no intervening layers on the supporting sides of the transparent substrate. The chemical compositions and dry thickness of these hydrophilic overcoats can be the same or different, but in most embodiments they have essentially the same chemical composition and dry thickness on both supporting sides of the transparent substrate.

In some embodiments, each hydrophilic overcoat (first or second, or both) comprises one or more silver halides in the same or different amount so as to provide silver metal particles after exposure and processing, in an amount of at least 5 mg Ag/m² and up to and including 150 mg Ag/m², or at least 5 mg Ag/m² and up to and including 75 mg Ag/m². When present, the one or more silver halides in each hydrophilic overcoat can have a grain ESD of at least 100 nm and up to and including 1000 nm, or at least 150 nm and up to and including 600 nm. In some embodiments, the one or more silver halides in each hydrophilic overcoat have a grain ESD that is larger than the grain ESD of the silver halide in the non-color hydrophilic photosensitive layer over which it is disposed. In various embodiments, the silver halide(s) in each hydrophilic overcoat comprises up to 100 mol % bromide or up to 100 mol % chloride, and up to and including 3 mol % iodide, all molar amounts based on total silver content. In other embodiments, the silver halide(s) in each hydrophilic overcoat comprises more chloride than the silver halide in the non-color hydrophilic photosensitive layer over which it is disposed. This relationship can be the same or different on both supporting sides of the transparent substrate in the "duplex" conductive film element precursors.

When present, the silver halide is dispersed (generally uniformly) within one or more hydrophilic binders or colloids in each hydrophilic overcoat, which hydrophilic binders or colloids include those described above for the non-color hydrophilic photosensitive layers. In many embodiments, the same hydrophilic binders or colloids can be used in all of the layers of the precursor. However, different hydrophilic binders or colloids can be used in the various layers, and on either or both supporting sides of the transparent substrate. The amount of one or more hydrophilic binders or colloids in each hydrophilic overcoat is the same or different and generally at least 50 weight % and up to and including 100 weight %, or typically at least 75 weight % and up to and including 98 weight %, all based on total hydrophilic overcoat dry weight.

In some embodiments, the hydrophilic overcoat can further comprise one or more radiation absorbers such as UV radiation absorbers in an amount of at least 5 mg/m² and up to and including 100 mg/m².

The same hydrophilic binders or colloids are used if no silver halide is present, and in such embodiments, the hydrophilic binders or colloids can comprise up to and including 100 weight % of the total hydrophilic overcoat dry weight.

Each hydrophilic overcoat can also comprise one or more hardeners for a hydrophilic binder or colloid (such as gelatin or a gelatin derivative). Useful hardeners are described above.

The dry thickness of the each hydrophilic overcoat can be at least 100 nm and up to and including 800 nm or more particularly at least 300 nm and up to and including 500 nm. In embodiments containing silver halide, the grain ESD to dry thickness ratio in the hydrophilic overcoat can be from 0.25:1 to and including 1.75:1 or more likely from 0.5:1 to and including 1.25:1.

In addition to the layers and components described above on one or both supporting sides of the transparent substrate, the precursors and electrically-conductive articles can also include other layers that are not essential but can provide additional properties or benefits, including but not limited to radiation absorbing filter layers, adhesion layers, and other layers as are known in the black-and-white photographic art. The radiation absorbing filter layers can also be known as "antihalation" layers that can be located between the essential layers and each supporting side of the transparent substrate. For example, each supporting side can have a radiation absorbing filter layer disposed directly on it, and directly underneath the photosensitive silver halide emulsion layer. Such radiation absorbing filter layers can include one or more filter dyes that absorb in the UV, red, green, or blue regions of the electromagnetic spectrum, or any combination thereof, and can be located between the transparent substrate and the photosensitive silver halide emulsion layer on each or both supporting sides of the transparent substrate.

The duplex electrically-conductive film element precursors can comprise on the opposing second supporting side of the transparent substrate, a second photosensitive silver halide emulsion layer and optionally, a second hydrophilic overcoat disposed over the second photosensitive silver halide emulsion layer. A radiation absorbing filter layer can be disposed between the opposing second supporting side of the transparent substrate and the second photosensitive silver halide emulsion layer, which radiation absorbing filter layer can be the same as or different from the radiation absorbing filter layer on the first supporting side of the transparent substrate. For example, such radiation absorbing filter layers can include one or more UV radiation absorbing compounds.

In many duplex electrically-conductive film element precursors, the second photosensitive silver halide emulsion layer and a second hydrophilic overcoat (if present) have the same composition as the first photosensitive silver halide emulsion layer and the first hydrophilic overcoat, respectively.

The various layers described above can be formulated using appropriate components and coating solvents and are applied to one or both supporting sides of a suitable transparent substrate (as described above) using known coating procedures including those commonly used in the photographic industry (for example, bead coating, blade coating, curtain coating, spray coating, and hopper coating). Each layer formulation can be applied to each supporting side of the transparent substrate in single-pass procedures or in simultaneous multi-layer coating procedures. Known drying techniques can be used to dry each of the applied formulations.

The resulting conductive film element precursors can be used immediately for an intended purpose, or they can be stored in roll or sheet form for later use. For example, the precursors can be rolled up during manufacture and stored for use in a roll-to-roll imaging and processing process, and subsequently cut into desired sizes and shapes.

To imagewise expose a precursor, a suitable mask element or group of mask elements are designed with predetermined patterns for both electrically-conductive metallic grids and electrically-conductive metallic connectors that are eventually formed in the electrically-conductive articles. As noted above, the photosensitive silver halide emulsion layers in the precursors are generally designed to accommodate both touch regions having desired electrically-conductive metallic grids, and electrically-conductive metallic connector wire patterns to provide designed circuitry. Both touch regions and electrode connector regions are formed in the same photosensitive silver halide emulsion layer on one or both supporting sides of the transparent substrate for example, at the same time in a common process step. The transparent regions outside of the electrically-conductive metallic grids and electrically-conductive metallic connectors generally contain no silver metal particles.

Thus, one or both sides of a precursor are designed to be exposed to suitable radiation to provide, in each photosensitive silver halide emulsion layer: (a) a latent electrically-conductive silver grid, and (b) a latent electrically-conductive silver connector that is different from the latent electrically-conductive silver grid. Each side of the precursor can be imagewise exposed at the same time or they can be imagewise exposed at different times, using different mask elements so the opposing latent images in all regions are different in design, size, surface area covered by the silver metal particles, or sheet resistivity. Opposing photosensitive silver halide emulsion layers can also be designed to have different wavelength sensitivity so that different imaging (exposing) radiation wavelengths can be used for exposure of opposing supporting sides.

Thus, photosensitive silver halides in photosensitive silver halide emulsion layers can be imagewise exposed to appropriate actinic radiation (UV to visible radiation) from a suitable source that is well known in the art such as a xenon lamp, mercury lamp, or other source of radiation of from 200 nm and up to and including 700 nm.

The exposed precursors can be processed using various aqueous-based processing solutions including at least solution physical development and silver halide fixing, to provide in each exposed photosensitive silver halide emulsion layer: (a) an electrically-conductive silver grid from the latent electrically-conductive silver grid, (b) an electrically-conductive silver connector from the latent electrically-conductive silver connector, and (c) transparent regions outside of both the electrically-conductive silver grid and the electrically-conductive silver connector.

The resulting electrically-conductive silver grid is formed in the touch region generally has an integrated transmittance of at least 75% (for example, the electrically-conductive silver grid covers 25% or less of the total touch region surface area). In contrast, the resulting electrically-conductive silver connector formed in the electrode connector regions has an integrated transmittance of 68% or less (or 50% or less). Thus, the electrically-conductive silver connector generally covers more than 32% of the total electrode connector region. Integrated transmittance is determined as described above. These amounts can be the same or different on opposing supporting sides of the transparent substrate.

Prebath solutions can also be used to treat the exposed silver salts prior to development. Such solutions can include one or more development inhibitors as described above for the developing solutions, and in the same or different amounts. Effective inhibitors include but are not limited to, benzotriazoles, heterocyclic thiones, and mercaptotetrazoles. The prebath temperature can be in a range as described for development. Prebath time depends upon the concentration and particular inhibitor, but it can range from at least 10 seconds and up to and including 4 minutes.

Processing the exposed silver halide in the latent images is generally accomplished firstly with one or more development steps during which silver ions in the silver halide latent images are reduced to silver metal (or silver particles). Such development steps are generally carried out using known aqueous developing solutions that are commonly used in silver metal image-forming black-and-white photography and typically include at least one solution physical development solution.

Numerous silver metal image-forming black-and-white developing solutions (identified also as "developers") are known that can develop the exposed (latent image containing) silver halides described above to form silver metal particles. One commercial silver metal image-forming black-and-white silver halide developer that is useful is Accumax® silver halide developer. Silver metal image-forming black-and-white developing solutions are generally aqueous solutions including one or more silver halide developing agents, of the same or different type, including but not limited to those described in Research Disclosure Item 17643 (December, 1978) Item 18716 (November, 1979), and Item 308119 (December, 1989) such as polyhydroxybenzenes (such as dihydroxybenzene, or in its form as hydroquinone, cathecol, pyrogallol, methylhydroquinone, and chlorohydroquinone), aminophenols such as p-methylaminophenol, p-aminophenol, and p-hydroxyphenylglycine, p-phenylenediamines, ascorbic acid and its derivatives, reductones, erythrobic acid and its derivatives, 3-pyrazolidones such as 1-phenyl-4,4-dimethyl-3-pyrazolidone, 1-phenyl-3-pyrazolidone, and 1-phenyl-4-methyl-4-hydroxymethyl-3-pyrazolidone, pyrazolone, pyrimidine, dithionite, and hydroxylamines. These developing agents can be used individually or in combinations thereof. One or more developing agents can be present in suitable amounts for example of at least 0.01 mol/l and up to and including 1 mol/l.

The black-and-white developing solutions can also include auxiliary silver developing agents that exhibit super-additive properties with a developing agent. Such auxiliary developing agents can include but are not limited to, p-aminophenols and substituted or unsubstituted phenidones, in suitable amounts such as at least 0.001 mol/l and up to and including 0.1 mol/l.

The concentration of the one or more auxiliary silver developing agents can be less than the concentration of the one or more developing agents as described above.

Useful black-and-white developing solutions can also include one or more silver complexing agents (or silver ligands) including but not limited to, sulfite, thiocyanate, thiosulfate, thiourea, thiosemicarbazide, tertiary phosphines, thioethers, amines, thiols, aminocarboxylates, triazolium thiolates, pyridines (including bipyridine), imidazoles, and aminophosphonates, in known amounts. For example, one or more alkali metal sulfites can be present in an amount of at least 0.1 mol/l and up to and including 1 mol/l.

The black-and-white developing solutions can also comprise one or more alkyl- or aryl-substituted or unsubstituted mercaptotetrazoles in suitable amounts for various purposes such as at least 0.25 mmol/l and up to and including 2.5 mmol/l. Useful mercaptotetrazoles include but are not limited to, alkyl-, aryl-, and heterocyclyl-substituted mercaptotetrazoles. Examples of such compounds include but are not limited to, 1-phenyl-5-mercaptotetrazole (PMT), 1-ethyl-5-mercaptotetrazole, 1-t-butyl-5-mercaptotetrazole, and 1-pyridinyl-5-mercaptotetrazoles.

Moreover, the black-and-white developing solution can also include one or more development inhibitors in suitable amounts. Useful development inhibitors include but are not limited to, substituted and unsubstituted benzotriazole compounds such as 5-methylbenzotriazole, imidazoles, benzimidazole thiones, benzothiazole thiones, benzoxazole thiones, and thiazoline thiones, all in the same or different amounts as described above for the mercaptotetrazoles.

Other addenda that can be present in the black-and-white developing solutions in known amounts include but are not limited to, metal chelating agents, preservatives (such as sulfites), antioxidants, small amounts of water-miscible organic solvents (such as benzyl alcohol and diethylene glycol), nucleators, as well as acids, bases (such as alkali hydroxides), and buffers (such as carbonate, borax, phosphates, and other basic salts) to establish a pH of at least 8 and generally of a pH of at least 9.5, or at least 11 and up to and including 14.

The silver halide developing solution can be supplied at working strength or in concentrated form that is diluted prior to or during use up to 5 times with water.

Multiple development steps can be used if desired. For example, a first developing solution can provide initial development to form silver metal nuclei and then a second developing solution can be used to provide "solution physical development" that improves conductivity of the resulting silver metal images.

A solution physical development step can be carried out using a solution having a pH of at least 8 and up to and including 13. This silver halide solution physical developing solution can comprise one or more primary developing agents chosen from one or more of hydroquinone or its derivatives or one or more ascorbic acid or derivatives thereof. The primary developing agents in the silver halide solution physical developing solution can be the same or different as the primary developing agents in the silver halide developing solution described above.

The one or more primary developing agents in the silver halide solution physical developing solution can be present in a total amount of at least 0.01 mol/l and up to and including 1 mol/l.

In addition, the silver halide solution physical developing solution comprises one or more silver halide dissolution catalysts as essential components in an amount of at least 0.001 mol/l and up to and including 0.1 mol/l, or typically of at least 0.005 mol/l and up to and including 0.05 mol/l.

Useful silver halide dissolution catalysts include but are not limited to, alkali metal thiocyanate salts such as sodium thiocyanate and potassium thiocyanate, thioethers such as 3,6-dithia-1,8-octanediol, and heterocyclic thiones such as tetrahydro-4,6-dimethyl-1,3,5-triazine-2(1H)-thione, and tetrahydro-3-hydroxyethyl-1,3,5-triazine-2(1H)-thione. These compounds can readily complex with silver.

In some embodiments, the silver halide solution physical developing solution contains substantially no catalytic developing agents such as those compounds described above for the silver halide developing solution. The term "substantially no" means that less than 0.001 mol/l or even less than 0.0001 mol/l of such compounds are purposely incorporated into or created in the solution.

The silver halide solution physical developing solution can further comprise one or more alkali metal sulfites including sodium sulfite, potassium sulfite, and mixtures thereof. The alkali metal sulfites can be present in the silver halide solution physical developing solution in a total amount of at least 0.2 mol/l and up to and including 3 mol/l when potassium sulfite or sodium sulfite is used or particularly when only potassium sulfite is used.

The silver halide solution physical developing solution can further include one or more polyaminopolycarboxylic acid salts that are capable of complexing with silver ion, including but not limited to, diethylenetriamine pentaacetic acid, pentasodium salt and other similar compounds known in the art. Such compounds can be useful particularly when a sulfite is not present. Such compounds can be present in an amount of at least 0.001 mol/l and up to and including 0.03 mol/l.

The silver halide solution physical developing solution can also include one or more metal ion complexing agents that can complex with silver, calcium, iron, magnesium, or other metal ions that can be present. Silver or calcium metal ion complexing agents can be particularly useful in a total amount of at least 0.001 mol/l.

Particularly useful silver halide solution physical developing solutions include but are not limited to, hydroquinone or a derivative thereof and sodium thiocyanate or potassium thiocyanate, and optionally a sulfite and calcium or silver metal ion complexing agent.

The silver halide physical solution developing solution can be provided at working strength or in a concentrated form that is suitably diluted prior to or during processing using known processing equipment and procedures. For example, the silver halide physical developing solution can be concentrated at least 4 times compared to a desired working strength concentration.

Useful development temperatures can range from at least 15° C. and up to and including 60° C. Useful development times can range from at least 10 seconds and up to and including 10 minutes but more likely up to and including 1 minute. The same time or temperature can be used for individual development steps and can be adapted to develop at least 90 mol % of the exposed silver halide in all latent silver halide images. If a prebath solution is not used, the development time can be extended appropriately. Any exposed silver halide(s) in a hydrophilic overcoat is also developed during the development step(s). Washing or rinsing can be carried out with water after or between any development steps.

After development of the exposed silver halide to silver metal, the undeveloped silver halide in all photosensitive silver halide emulsion layers is generally removed by treating the developed silver-containing article with a silver halide fixing solution. Silver halide fixing solutions are well known in the black-and-white photographic art and contain one or more compounds that complex the silver ion for removal from the layers. Thiosulfate salts are commonly used in silver halide fixing solutions. The silver halide fixing solution can optionally contain a hardening agent such as alum or chromealum. The developed film can be processed in a silver halide fixing solution immediately after development, or there can be an intervening stop bath or water wash or rinse, or both stop bath and water rinse. Fixing can be carried out at any suitable temperature and time such as at least 20° C. for at least 30 seconds.

Fixing then leaves the silver metal particles in the conductive silver metal electrode grid and electrically-conductive silver connector in each formerly photosensitive silver halide emulsion layer. Fixing also removes any non-developed silver halide in any hydrophilic overcoat.

After fixing, the resulting intermediate article can be washed or rinsed in water that can optionally include surfactants or other materials to reduce water spot formation upon drying.

After fixing, the intermediate article can be further treated to further enhance the conductivity of the silver metal (or nuclei) on each supporting side of the transparent substrate. A variety of ways have been proposed to carry out this "conductivity enhancement" process. For example, U.S. Pat. No. 7,985,527 (Tokunaga) and U.S. Pat. No. 8,012,676 (Yoshiki et al.) describe conductivity enhancement treatments using hot water baths, water vapor, reducing agents, or halides.

It is also possible to enhance conductivity of the silver metal particles by repeated contact with a conductivity enhancing agent, washing, drying, and repeating this cycle of treating, washing, and drying one or more times. Useful conductivity enhancing agents include but are not limited to, sulfites, borane compounds, hydroquinones, p-phenylenediamines, and phosphites. The treatment can be carried out at a temperature of at least 30° C. and up to and including 90° C. for at least 15 seconds and up to and including 30 minutes.

It can be useful in some embodiments to treat the electrically-conductive article with a hardening bath after fixing and before drying to improve the physical durability of the resulting conductive article. Such hardening baths can include one or more known hardening agents in appropriate amounts that would be readily apparent to one skilled in the art. It can be desired to control the swelling of the conductive film element precursor at one or more stages of processing, so that swelling is limited to a desired amount of the original precursor dry thickness.

Additional treatments such as a stabilizing treatment can also be carried out before a final drying if desired, at any suitable time and temperature.

Drying at any stage can be accomplished in ambient conditions or by heating, for example, in a convection oven at a temperature above 50° C. but below the glass transition temperature of the transparent substrate.

While imagewise exposing and processing of each side of the precursor can be carried out at different times or sequences, in many embodiments, imagewise exposing and processing of the photosensitive silver halide emulsion layer on the opposing second supporting side of the transparent substrate is carried out simultaneously with imagewise exposing and processing of the photosensitive silver halide emulsion layer on the first supporting side.

The result of the processing steps is an electrically-conductive article of the present invention.

Electrically-Conductive Metallic Grids:

The electrically-conductive metallic grid on the first supporting side and the optional electrically-conductive metallic grid on the opposing second supporting side can be the same or different in composition, pattern arrangement, conductive line thickness, or shape of the grid lines (for example, a pattern of polygons including but not limited to, a pattern of rectangles, triangles, hexagons, rhombohedrals, octagons, or squares), circles or other curved lines, or random structures, all corresponding to the predetermined pattern in the mask element used during imagewise exposure. For example, in one embodiment, the electrically-conductive metallic grid on the first supporting side can be arranged in a square pattern, and the electrically-conductive metallic grid on the opposing supporting second side can be arranged in a diamond pattern. In each instance, the metallic grid lines in the electrically-conductive metallic grids form a net-like structure. In other embodiments, the various patterns on opposing supporting sides can be arranged in an alternative arrangement so that the electrically-conductive metallic grid on one supporting side only partially covers the electrically-conductive metallic grid on the opposing supporting side, somewhat as is shown in FIG. 14 of U.S. Patent Application Publication 2011/0289771 (noted above).

The electrically-conductive metallic wires (such as silver or copper wires) in the electrically-conductive metallic grid can have any desired length that is usually at least 1 cm and up to and including 10 meters, and they can have an average dry thickness (line width, one outer edge to the other outer edge) and dry height that are the same or different, and are generally less than 50 μm, but more likely at least 1 μm and up to and including 20 μm, or particularly at least 5 μm and less than 15 μm or even 10 μm or less.

Electrically-Conductive Metallic Connectors:

Each electrically-conductive metallic connector wire pattern comprises at least one and more likely at least two adjacent (for example, at least first and second) metallic (such as silver) main wires, and there can be up to 1000 or even more of these metallic main wires in each electrically-conductive metallic connector. The number of metallic main wires can be different on opposing supporting sides of the transparent substrate. Each metallic main wire comprises two or more (and up to 10 or even more) metallic (such as silver) micro-wires that are electrically connected to a metallic (such as silver) end wire at an end of the at least one (generally at least two adjacent) metallic main wires. Thus, the two or more metallic micro-wires and the metallic end wire in each metallic (such as silver) main wire forming a bundled pattern. Many bundled patterns comprise a plurality of metallic main wires, each of which comprises a plurality of metallic micro-wires and all of the metallic micro-wires are electrically connected at both ends to suitable metallic end wires. As described below, such bundled patterns can also include one or more metallic (such as silver) cross-wires.

In some embodiments, each metallic main wire can comprise from two to eight metallic micro-wires that with the suitable metallic end wires form a bundled pattern. Thus, each bundled pattern in such embodiments comprises a conductive metallic (such as silver) end wire at each end of the at least two adjacent metallic main wires (and thus at the end of each pair of adjacent metallic main wires in the bundled pattern) that electrically connects with the two to eight metallic micro-wires in each bundled pattern.

The average distance between any two adjacent metallic main wires is greater than the average distance between any two adjacent metallic micro-wires in each bundled pattern. For example, the average distance between any two adjacent metallic main wires can be greater than the average distance between any two adjacent metallic micro-wires in each bundled pattern by at least 30%, or more typically at least 100%. For example, the average distance between two adjacent metallic main wires can be at least 5 μm, or at least 10 μm, or even at least 20 μm. Such "average distances" are measured from the outer edge of a given metallic micro-wire to the nearest outer edge of an adjacent metallic micro-wire, or from the outer edge of the outermost metallic micro-wire in a given metallic main wire to the outer edge of the closest outermost metallic micro-wire in an adjacent metallic main wire.

Within each metallic main wire, the average total length of each metallic micro-wire can be at least 1 mm or typically at least 5 mm and up to and including 1000 mm.

The average distance between any two adjacent metallic micro-wires in each bundled pattern (of each and any metallic main wire) can be at least 2 μm and up to and including 10 μm (wherein "average distance" is defined above). In particular, the average distance between any two adjacent metallic micro-wires in each bundled pattern (or each and any metallic main wire) can be at least 5 μm and up to and including 8 μm.

The ratio of the average width (outer edge to opposing outer edge) of each metallic micro-wire to the average distance between two adjacent metallic micro-wires in each bundled pattern (or each and any metallic main wire) can be at least 0.5:1 but less than 2:1, or typically at least 1:1 and up to and including 2:1.

It is also desirable that for each metallic micro-wire, the ratio of maximum height to minimum height can be at least 1.05:1, or typically at least 1.1:1.

In some embodiments of at least one of the silver micro-wires (and in most embodiments, each metallic micro-wire), the maximum height of the metallic micro-wire can be equivalent (varying by less than 10%) to the center height of the metallic micro-wire wherein the "center" is determined to be essentially equidistant between the two outer edges of the metallic micro-wire. "Essentially equidistant" means that the distances between the two outer edges vary by no more than 10%.

In other embodiments of at least one of the metallic micro-wires (and in most embodiments, each metallic micro-wire), the maximum height can be closer to a micro-wire outer edge than to micro-wire center height (at least 51% closer to the outer edge than to the center). For example, the maximum height can actually be located at one or both outer edges of some metallic micro-wires.

It is also possible that for each metallic micro-wire, the ratio of maximum height to average height can be at least 1.01:1, or more typically at least 1.01:1 to and including 1.05:1.

The average width of each metallic micro-wire (from one outer edge to the other outer edge) in each bundled pattern can be at least 2 μm and up to and including 20 μm, or typically up to and including 15 μm or typically from 2 μm and up to and including 12 μm.

Moreover, each bundled pattern can comprise at least one metallic (such as silver) cross-wire between adjacent metallic micro-wires that is not at the end of the adjacent metallic micro-wires. Typically, adjacent metallic micro-wires comprise multiple metallic cross-wires that are not at the end of adjacent metallic micro-wires. A skilled worker can design each bundled pattern to have as many metallic cross-wires as can be desired for a given electrically-conductive metallic connector.

The metallic cross-wires can be arranged in any suitable frequency or directional arrangement and such arrangement can be the same or different for each set of adjacent metallic micro-wires.

For example, each bundled pattern can comprise multiple (two or more) metallic cross-wires between adjacent metallic micro-wires, wherein the multiple metallic cross-wires are arranged at a distance from each other of at least 100 μm.

Moreover, each bundled pattern can comprise multiple (two or more) metallic cross-wires in a set of adjacent metallic micro-wires that are offset from multiple metallic cross-wires in another set of adjacent metallic micro-wires (for example alternating along the adjacent sets of adjacent metallic micro-wires). All of the metallic cross-wires can therefore be arranged in the same or different manner among all of the adjacent sets of adjacent metallic micro-wires.

In some embodiments, each of the multiple metallic cross-wires is substantially perpendicular (intersection at an angle of substantially 90°) to the adjacent metallic micro-wires. In other embodiments, each of the multiple metallic cross-wires intersects the adjacent metallic micro-wires at an angle that is greater than or less than 90°. The two or more metallic micro-wires can be substantially parallel (for example, the adjacent metallic micro-wires are substantially parallel).

The present invention can also be exemplified in reference to FIGS. 1-12 that are now explained.

Firstly considering FIG. 12 that provides a general schematic of an embodiment of the present invention. Thus, FIG. 12 shows electrically conductive article 5 that includes electrically-conductive metallic grid 6 and electrically-conductive metallic connector 8 that is electrically connected to electrically-conductive metallic grid 6. Each electrically-conductive metallic connector 8 includes one or more metallic main wires 10 forming a bundled pattern. Each metallic main wire 10 includes one or more metallic micro-wires 20. Metallic end-wires 22 are electrically connected to metallic micro-wires 20 in each metallic main wire 10. Metallic cross-wires 24 can electrically connect metallic micro-wires 20 within metallic main wire 10.

In FIG. 1, electrically-conductive article 5 has transparent substrate 40 on which electrically-conductive metallic connector 8 is disposed, which electrically-conductive metallic connector 8 comprises multiple metallic main wires 10. Each metallic main wire 10 comprises multiple adjacent metallic micro-wires 20 (four shown in FIG. 1 for each metallic main wire 10). Metallic end wire 22 is shown at the end of each metallic main wire 10. Outside of electrically-conductive metallic connector 8 is transparent region 50 (referenced in some but not all places). Transparent regions (not shown with additional reference numbers) are also present between (or outside) adjacent metallic main wires 10 and between (or outside) adjacent metallic micro-wires 20 in each metallic main wire 10. All transparent regions contain no significant metallic materials. In electrically-conductive article 5, adjacent metallic main wires (at least one identified as 10) are separated by distance S1 and the distance between adjacent metallic micro-wires (one identified as 20) is shown by S2. As described above, the average S1 is greater than the average S2 in each bundled pattern (metallic main wire 10). Representative average metallic micro-wire 20 width is shown as W and average metallic micro-wire length is shown as L. Each metallic micro-wire 20 can have essentially the same or different L and W dimensions. In most embodiments, such dimensions are the same for each metallic micro-wire in a given metallic main wire.

FIG. 2 shows a schematic cross-section of electrically-conductive article 5 comprising transparent substrate 40 having first supporting side 42 and opposing second supporting side 44. A representative metallic micro-wire 20 is shown on both first supporting side 42 and opposing second supporting side 44.

In the cross-section view shown in FIG. 3A, a portion of photosensitive silver halide emulsion layer 15 is disposed on a supporting side (either first supporting side or opposing second supporting side) of transparent substrate 40 having first supporting side 42 and opposing second supporting side 44. This portion of photosensitive silver halide emulsion layer 15 contains multiple non-exposed and non-developed silver halide grains 60 surrounded by hydrophilic binder 64.

FIG. 3B shows a similar view as FIG. 3A but silver (metallic) micro-wire 20 is disposed on transparent substrate 40 having first supporting side 42 and opposing second supporting side 44, which silver (metallic) micro-wire 20 contains multiple silver metal particles 62 that can be derived from exposure and silver halide development of the multiple silver halide grains 60 surrounded by hydrophilic binder 64, shown in the portion of photosensitive silver halide emulsion layer 15 illustrated in FIG. 3A.

Figure 4:
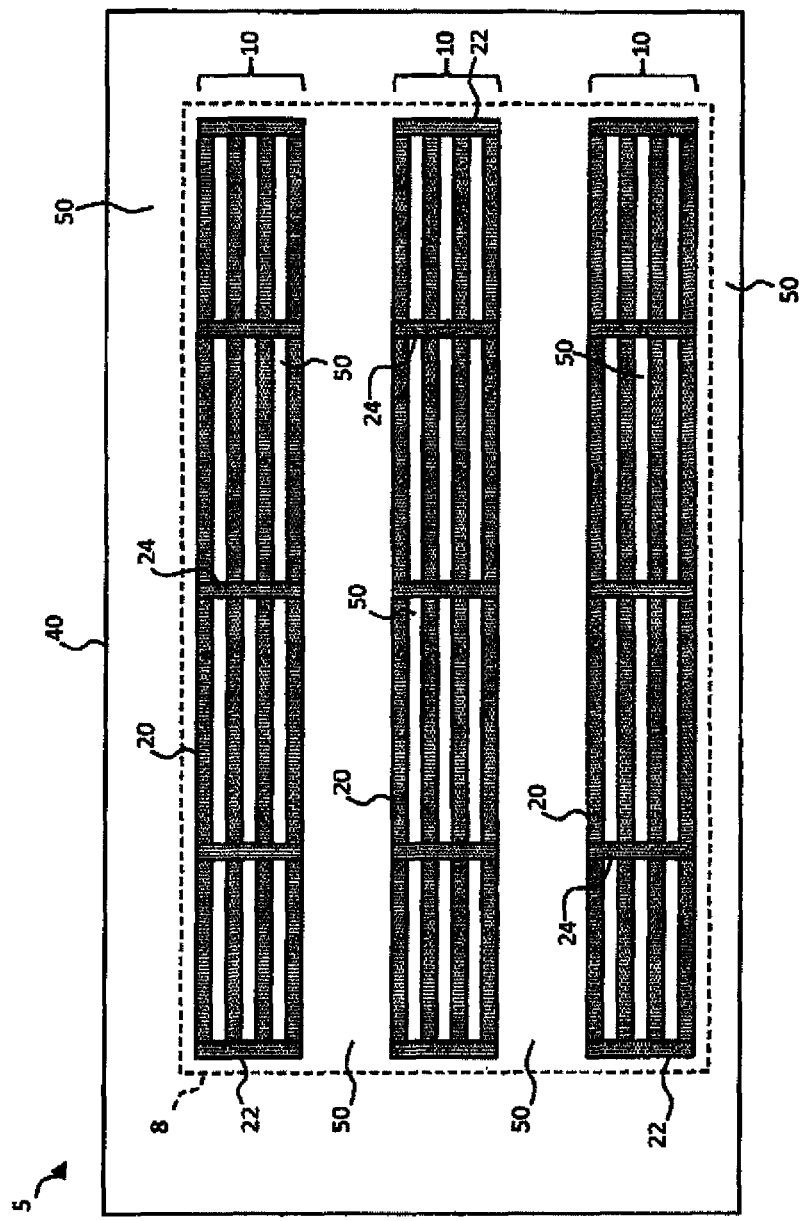
FIGS. 4 and 5 are schematic illustrations of electrically-conductive metallic (such as silver) connector wire patterns shown on one supporting side of a transparent substrate, showing both metallic (such as silver) end wires and different arrangements of metallic (such as silver) cross-wires in multiple bundled patterns.

FIG. 4 is similar to FIG. 1 and shows electrically-conductive article 5 comprising transparent substrate 40 on which electrically-conductive metallic connector 8 is disposed. Electrically-conductive metallic connector 8 comprises multiple metallic main wires 10. Metallic silver main wires 10 are shown but electrically-conductive metallic connector 8 can have as few as two metallic main wires. Moreover, while only four metallic micro-wires 20 are shown for each metallic main wire 10, the number of metallic micro-wires in each metallic main wire can be as few as two and up to and including ten. Metallic end wires 22 are shown at the end of each set of adjacent metallic micro-wires 20 and various metallic cross-wires 24 (only some are referenced) are shown at the same interval along metallic micro-wires 20. Outside of electrically-conductive metallic connector 8 is transparent region 50 (referenced in only some places), but transparent regions (not referenced) also exist between adjacent metallic micro-wires and between adjacent metallic main wires.

Figure 5:
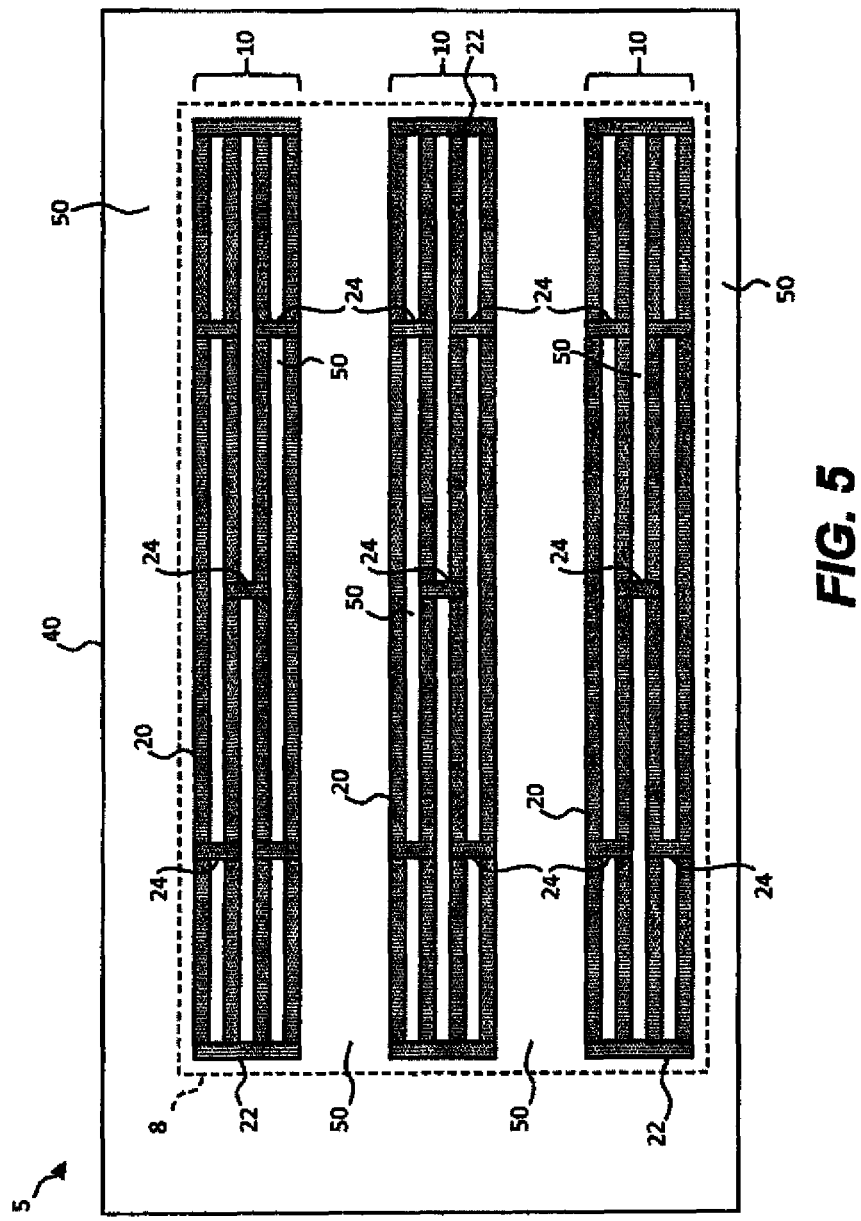

FIG. 5 is similar to FIG. 4 but metallic cross-wires 24 are arranged at different intervals along metallic micro-wires 20 and are offset between pairs of adjacent metallic micro-wires 20. Thus, each bundled pattern or metallic main wire 10 comprises multiple metallic cross-wires 24 in a set of adjacent metallic micro-wires 20, which are offset from multiple metallic cross-wires 24 in an adjacent set of adjacent metallic micro-wires 20.

FIG. 6 shows representative portions of some embodiments of the method of this invention in which a conductive film element precursor ("precursor") is provided in feature 100 using photosensitive silver halide technology, imagewise exposed to suitable radiation in feature 105, and the resulting latent silver is processed [including development using suitable silver metal image-forming black-and-white developing solution(s)] in the precursor in feature 110.

FIG. 7 shows representative portions of other embodiments using photosensitive silver halide technology in which a provided duplex conductive film element precursor ("precursor") is imagewise exposed in feature 105 in two individual features of imagewise exposure of a first side of the duplex conductive film element precursor in feature 107 and sequential imagewise exposure of the second (or opposing) side of the duplex conductive film element precursor in feature 109, followed by processing (including development) of the resulting latent silver in both imagewise exposed sides of the precursor in feature 110.

FIG. 8 shows representative portions of yet another variation in which imagewise exposure feature 105 is carried out simultaneously for both first and second sides of a duplex conductive film element precursor ("precursor") as shown in features 107 and 109, and then followed by processing (including development) of latent silver on both sides of the imagewise exposed precursor in feature 110.

Figure 9:
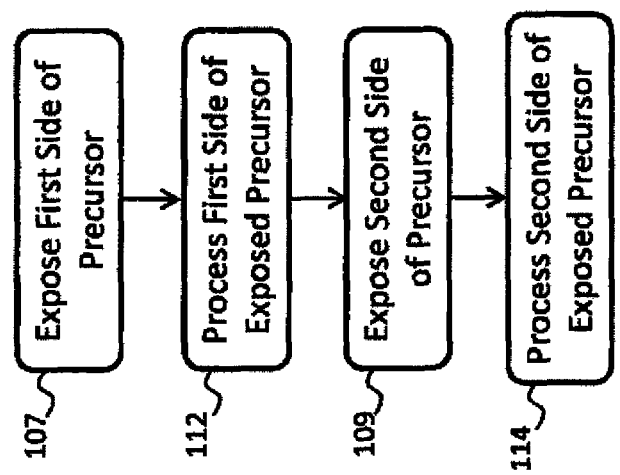

Still other representative portions of the method of this invention are shown in FIG. 9 in which imagewise exposure of a first side of a duplex conductive film element precursor ("precursor") is provided in 107, which imagewise exposed first side is then processed (for example, development) to provide silver metal particles from latent silver in feature 112. The second (or opposing) side of the duplex conductive film element precursor is also imagewise exposed in 109 followed by appropriate processing (including development) of latent silver to silver metal particles in the precursor in feature 114. Imagewise exposure and processing on the two sides can be carried out at the same time if desired.

Figure 10:
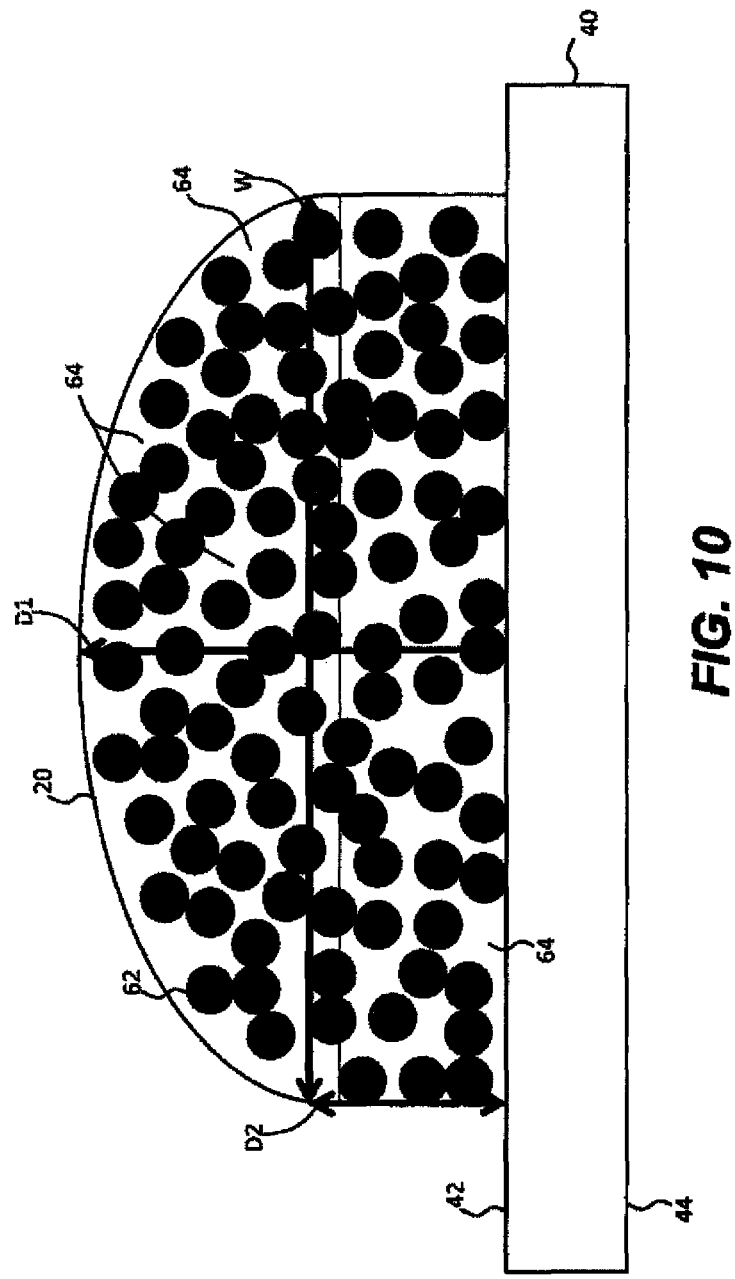
FIG. 10 is a schematic cross-sectional view of a metallic (such as silver) micro-wire on a transparent substrate, which metallic micro-wire has a maximum height essentially at its center.

FIG. 10 is a schematic cross-sectional view of a typical metallic micro-wire 20 that has a rounded upper and outer surface, and is disposed on transparent substrate 40 having first supporting side 42 and opposing second supporting side 44. Metallic (such as silver) micro-wire 20 is therefore composed of multiple silver metal nuclei (particles) 62 surrounded by hydrophilic binder 64, which have been derived for example from appropriate silver halide grains using the chemical compositions, appropriate exposure, and processing chemistry described above. As shown in FIG. 10, metallic (such as silver) micro-wire 20 has average width W, metallic (such as silver) micro-wire maximum height D1, and metallic (such as silver) micro-wire minimum height D2, wherein metallic (such as silver) micro-wire maximum height D1 is greater than metallic (such as silver) micro-wire minimum height D2 for example by a ratio of at least 1.05:1. While FIG. 10 illustrates a metallic (such as silver) micro-wire that has uniform dimensions and contours, it would be understood by a skilled artisan that the drawn illustration is representative only and that actual metallic micro-wires produced in the practice of this invention can have more irregular outer surfaces and shapes.

Figure 11:
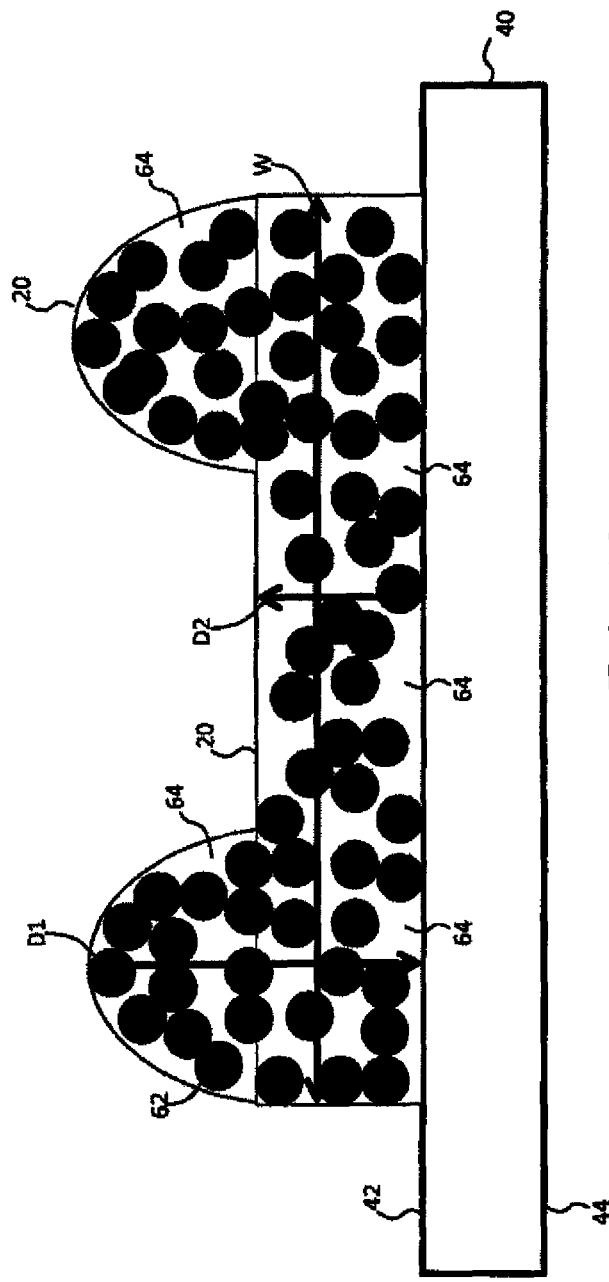
FIG. 11 is a schematic cross-sectional view of a metallic (such as silver) micro-wire on a transparent substrate, which metallic micro-wire has a maximum height closer to its outer edge than to its center.

FIG. 11 is another schematic cross-sectional view showing a different shape for metallic (such as silver) micro-wire 20 containing multiple silver metal particles 62 surrounded in hydrophilic binder 64, which silver micro-wire 20 is disposed on transparent substrate 40 having first supporting side 42 and opposing second supporting side 44. Metallic (such as silver) micro-wire minimum height D2 is at or near the center of metallic (such as silver) micro-wire 20, and metallic (such as silver) micro-wire minimum height D2 is less than metallic (such as silver) micro-wire maximum height D1 that is near or at either or both outer edges of metallic (such as silver) micro-wire 20. As one skilled in the art would understand, such illustration of metallic (such as silver) micro-wire 20 is representative only and actual metallic micro-wires produced in the practice of this invention can exhibit maximum and minimum heights that vary considerably from that shown and can thus have more irregular outer surfaces.

The present invention provides at least the following embodiments and combinations thereof, but other combinations of features are considered to be within the present invention as a skilled artisan would appreciate from the teaching of this disclosure:

1. An electrically-conductive article comprising a transparent substrate having a first supporting side and an opposing second supporting side, and comprising on the first supporting side:

(a) an electrically-conductive metallic grid, (b) an electrically-conductive metallic connector that is electrically connected to the electrically-conductive metallic grid, and optionally, (c) transparent regions outside of both the electrically-conductive metallic grid and the electrically-conductive metallic connector, wherein:

(i) the electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;

(ii) the average length of each metallic micro-wire is at least 1 mm; and (iii) the electrically-conductive metallic connector has an integrated transmittance of less than 68%.

2. The electrically-conductive article of embodiment 1, wherein:

(iv) for each metallic micro-wire, the ratio of maximum height to minimum height is at least 1.05:1.

3. The electrically-conductive article of embodiment 1 or 2, wherein:

(v) the ratio of the average width of each metallic micro-wire to the average distance between two adjacent metallic micro-wires in each bundled pattern is at least 0.5:1 but less than 2:1.

4. The electrically-conductive article of any of embodiments 1 to 3, wherein the electrically-conductive metallic connector comprises at least two adjacent metallic main wires, and the average distance between the at least two adjacent metallic main wires is greater than the average distance between any two adjacent metallic micro-wires in each bundled pattern.

5. The electrically-conductive article of embodiment 4, wherein the average distance between any two adjacent metallic micro-wires in each bundled pattern is at least 2 urn and up to and including 10 urn.

6. The electrically-conductive article of any of embodiments 1 to 5 further comprising on the opposing second supporting side of the transparent substrate:

(a) an opposing electrically-conductive metallic grid, (b) an opposing electrically-conductive metallic connector that is electrically connected to the opposing electrically-conductive metallic grid, and optionally, (c) transparent regions outside of both the opposing electrically-conductive metallic grid and the opposing electrically-conductive metallic connector, wherein:

(i) the opposing electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;

(ii) the average length of each metallic micro-wire is at least 1 mm; and (iii) the opposing electrically-conductive metallic connector has an integrated transmittance of less than 68%.

7. The electrically-conductive article of embodiment 6, wherein, in the opposing electrically-conductive metallic connector:

(iv) for each metallic micro-wire, the ratio of maximum height to minimum height is at least 1.05:1.

8. The electrically-conductive article of embodiment 6 or 7, wherein, in the opposing electrically-conductive metallic connector:

(v) the ratio of the average width of each metallic micro-wire to the average distance between two adjacent metallic micro-wires in each bundled pattern is at least 0.5:1 but less than 2:1.

9. The electrically-conductive article of any of embodiments 6 to 8, wherein the opposing electrically-conductive metallic connector comprises at least two adjacent metallic main wires, and the average distance between the at least two adjacent metallic main wires is greater than the average distance between any two adjacent metallic micro-wires in each bundled pattern.

10. The electrically-conductive article of embodiment 9, wherein the average distance between any two adjacent metallic micro-wires in each bundled pattern in the opposing electrically-conductive metallic connector is at least 2 μm and up to and including 10 μm.

11. The electrically-conductive article of any of embodiments 6 to 10, wherein the transparent substrate is a continuous polymeric web.

12. The electrically-conductive article of any of embodiments 1 to 11, wherein for each metallic micro-wire, the ratio of maximum height to minimum height is at least 1.1:1.

13. The electrically-conductive article of any of embodiments 1 to 12, wherein at least one metallic micro-wire has a maximum height that is the same as its center height.

14. The electrically-conductive article of any of embodiments 1 to 12, wherein at least one metallic micro-wire has a maximum height that is closer to its outer edge than to its center height.

15. The electrically-conductive article of any of embodiments 1 to 14, wherein each metallic micro-wire has a ratio of maximum height to average height of at least 1.05:1.

16. The electrically-conductive article of any of embodiments 1 to 15, wherein the average width of each metallic micro-wire is at least 5 μm and up to and including 20 μm.

17. The electrically-conductive article of any of embodiments 1 to 16, wherein each bundled pattern comprises at least one metallic cross-wire between adjacent metallic micro-wires that is not at the end of the adjacent metallic micro-wires.

18. The electrically-conductive article of any of embodiments 1, wherein each bundled pattern comprises multiple metallic cross-wires between adjacent metallic micro-wires, wherein the multiple metallic cross-wires are arranged at a distance from each other of at least 100 μm.

19. The electrically-conductive article of any of embodiments 1, wherein each bundled pattern comprises multiple metallic cross-wires in a set of adjacent metallic micro-wires that are offset from multiple metallic cross-wires in an adjacent set of adjacent metallic micro-wires.

20. The electrically-conductive article of embodiment 19, wherein each of the multiple metallic cross-wires is substantially non-perpendicular to the adjacent metallic micro-wires.

21. The electrically-conductive article of any of embodiments 1 to 20, wherein the average distance between any two adjacent metallic main wires is greater than the average distance between any two adjacent metallic micro-wires in each bundled pattern by at least 30%.

22. The electrically-conductive article of any of embodiments 1 to 21, wherein the ratio of the average width of each metallic micro-wire to the average distance between two adjacent metallic micro-wires in each bundled pattern is at least 1:1 and up to and including 2:1.

23. The electrically-conductive article of any of embodiments 1 to 22, wherein the electrically-conductive metallic connector has an integrated transmittance of less than 50% and the electrically-conductive metal grid has an integrated transmittance of at least 90%.

24. The electrically-conductive article of any of embodiments 6 to 9, wherein the opposing electrically-conductive metallic connector has an integrated transmittance of less than 50% and the opposing electrically-conductive metallic grid has an integrated transmittance of at least 90%.

25. A touch screen device comprising the electrically-conductive article of any of embodiments 1 to 24.

Other useful embodiments are:

1. A method for preparing a touch screen module, the method comprising:

providing an electrically-conductive article that comprises a transparent substrate having a first supporting side and an opposing second supporting side, and the electrically-conductive article comprising on the first supporting side:

(a) an electrically-conductive metallic grid, (b) an electrically-conductive metallic connector that is electrically connected to the electrically-conductive metallic grid, and optionally, (c) transparent regions outside of both the electrically-conductive metallic grid and the electrically-conductive metallic connector, wherein:

(i) the electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;

(ii) the average length of each metallic micro-wire is at least 1 mm; and (iii) the electrically-conductive metallic connector has an integrated transmittance of less than 68%;

electrically-connecting each of the metallic main wires in the electrically-conductive metallic connector to a separate conductor; and laminating a side of the electrically-conductive article to a carrier support.

2. The method of embodiment 1, wherein laminating the electrically-conductive article comprises laminating the second supporting side of the electrically conductive article to the carrier support.

3. The method of embodiment 1 or 2 wherein, laminating the electrically-conductive article comprises laminating the first supporting side of the electrically-conductive article to the carrier support.

4. The method of any of embodiments 1 to 3, comprising using two or more separate conductors as wires in a ribbon cable.

5. The method of any of embodiments 1 to 4, wherein the carrier support is a transparent cover or film through which light passes from a display.

6. The method of any of embodiments 1 to 5, wherein the carrier support is a transparent cover or film of a display, and the method further comprises locating the electrically-conductive article on a side of the transparent cover or film, opposite the display.

7. The method of any of embodiments 1 to 6, wherein the carrier support is a transparent cover or film of a display, and the method further comprises locating the electrically-conductive article between the transparent cover or film and the display.

8. The method of any of embodiments 1 to 7, wherein the carrier support is a transparent cover of a display, and the method further comprises affixing the transparent cover to the display.

9. The method of any of embodiments 1 to 8 further comprising electrically connecting the separate conductor to a controller.

10. The method of any of embodiments 1 to 9 further comprising electrically connecting the at least one metallic main wire to a controller.

11. The method of embodiment 9 or 10 further comprising affixing the controller to the carrier support.

Still other useful embodiments are the following:

1. A touch screen module, comprising:
    an electrically-conductive article that comprises a transparent substrate having a first supporting side and an opposing second supporting side, and the electrically-conductive article comprising on the first supporting side:
    (a) an electrically-conductive metallic grid,
    (b) an electrically-conductive metallic connector that is electrically connected to the electrically-conductive metallic grid, and optionally,
    (c) transparent regions outside of both the electrically-conductive metallic grid and the electrically-conductive metallic connector,
    (d) two or more separate conductors electrically-connected to the metallic main wires in the electrically-conductive metallic connector, and
    (e) a carrier support affixed to the electrically-conductive article,
    wherein:
    (i) the electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;
    (ii) the average length of each metallic micro-wire is at least 1 mm; and
    (iii) the electrically-conductive metallic connector has an integrated transmittance of less than 68%.

2. The touch screen module of embodiment 1, wherein the carrier support is affixed to the second supporting side of the electrically conductive article.

3. The touch screen module of embodiment 1, wherein the carrier support is affixed to the first supporting side of the electrically conductive article.

4. The touch screen module of any of embodiments 1 to 3, wherein the two or more separate conductors are wires in a ribbon cable.

5. The touch screen module of any of embodiments 1 to 4, wherein the carrier support is a transparent cover or film through which light passes from a display.

6. The touch screen module of any of embodiments 1 to 5, wherein the carrier support is a transparent cover or film of a display and the electrically-conductive article is affixed to a side of the transparent cover or film opposite the display.

7. The touch screen module of any embodiments 1 to 5, wherein the carrier support is a transparent cover or film of a display and the electrically-conductive article is located between the transparent cover or film and the display.

8. The touch screen module of any of embodiments 1 to 7, wherein the carrier support is a transparent cover of a display and the transparent cover is affixed to the display.

9. The touch screen module of any of embodiments 1 to 8, wherein two or more the separate conductors are electrically connected to a controller.

10. The touch screen module of any of embodiments 1 to 9, wherein the at least one metallic main wire is electrically connected to a controller.

11. The touch screen module of embodiment 10 wherein the controller is affixed to the carrier support.

12. The touch screen module of embodiment 10 wherein the controller is affixed to the first supporting side of the transparent substrate.

All of such embodiments can be used as follows:

1. A method of using a touch screen module, the method comprising:
    providing an electrically-conductive article that comprises a transparent substrate having a first supporting side and an opposing second supporting side, and the electrically-conductive article comprising on the first supporting side:
    (a) an electrically-conductive metallic grid,
    (b) an electrically-conductive metallic connector that is electrically connected to the electrically-conductive metallic grid, and optionally,
    (c) transparent regions outside of both the electrically-conductive metallic grid and the electrically-conductive metallic connector,
    (d) two or more separate conductors electrically-connected to the metallic main wires in the electrically-conductive metallic connector,
    (e) a carrier support affixed to the electrically-conductive article,
    (f) a controller electrically connected to the two or more separate conductors, the controller responsive to a touch on the electrically conductive article, and
    (g) a display affixed to or a part of the carrier support, the display responsive to the controller,
    wherein:
    (i) the electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;
    (ii) the average length of each metallic micro-wire is at least 1 mm; and
    (iii) the electrically-conductive metallic connector has an integrated transmittance of less than 68%; and
    touching the electrically-conductive article and observing a response to the touch on the display.

The invention has been described in detail with particular reference to certain preferred embodiments thereof, but it will be understood that variations and modifications can be effected within the spirit and scope of the invention.

PARTS LIST

5 Electrically-conductive article
6 Electrically-conductive metallic grid 8 Electrically-conductive metallic connector
10 Metallic main wire
15 Portion of photosensitive silver halide emulsion layer
20 Metallic micro-wire
22 Metallic end wire
24 Metallic cross-wire
40 Transparent substrate
42 First supporting side (of transparent substrate)
44 Opposing second supporting side (of transparent substrate)
50 Transparent region(s)
60 Non-exposed and non-developed silver halide grains
62 Silver particles
64 Hydrophilic binder
100 Conductive film element precursor provided
105 Conductive film element precursor imagewise exposed
107 Imagewise exposure of first side of conductive film element precursor
109 Imagewise exposure of second side of conductive film element precursor
110 Exposed conductive film element developed
112 Development of first side of imagewise exposed precursor
114 Development of second side of imagewise exposed precursor
D1 Metallic micro-wire maximum height
D2 Metallic micro-wire minimum height
L Metallic micro-wire length
S1 Distance between adjacent metallic main wires
S2 Distance between adjacent metallic micro-wires
W Metallic micro-wire width

The invention claimed is:

1. An electrically-conductive article comprising a transparent substrate having a first supporting side and an opposing second supporting side, and comprising on the first supporting side:
(a) an electrically-conductive metallic grid,
(b) an electrically-conductive metallic connector that is electrically connected to the electrically-conductive metallic grid,
wherein:
(i) the electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;
(ii) the average length of each metallic micro-wire is at least 1 mm; and
(iii) the electrically-conductive metallic connector has an integrated transmittance of less than 68%,
and optionally,
(c) transparent regions outside of both the electrically-conductive metallic grid and the electrically-conductive metallic connector.

2. The electrically-conductive article of claim 1, wherein:
(iv) for each metallic micro-wire, the ratio of maximum height to minimum height is at least 1.05:1.

3. The electrically-conductive article of claim 1, wherein:
(v) the ratio of the average width of each metallic micro-wire to the average distance between two adjacent metallic micro-wires in each bundled pattern is at least 0.5:1 but less than 2:1.

4. The electrically-conductive article of claim 1, wherein the electrically-conductive metallic connector comprises at least two adjacent metallic main wires, and the average distance between the at least two adjacent metallic main wires is greater than the average distance between any two adjacent metallic micro-wires in each bundled pattern.

5. The electrically-conductive article of claim 4, wherein the average distance between any two adjacent metallic micro-wires in each bundled pattern is at least 2 μm and up to and including 10 μm.

6. The electrically-conductive article of claim 1 further comprising on the opposing second supporting side of the transparent substrate:
(a) an opposing electrically-conductive metallic grid,
(b) an opposing electrically-conductive metallic connector that is electrically connected to the opposing electrically-conductive metallic grid,
wherein:
(i) the opposing electrically-conductive metallic connector comprises at least one metallic main wire that comprises two or more metallic micro-wires that are electrically connected to a metallic end wire at an end of the at least one metallic main wire, the two or more metallic micro-wires and the metallic end wire in the at least one metallic main wire forming a bundled pattern;
(ii) the average length of each metallic micro-wire is at least 1 mm; and
(iii) the opposing electrically-conductive metallic connector has an integrated transmittance of less than 68%,
and optionally,
(c) transparent regions outside of both the opposing electrically-conductive metallic grid and the opposing electrically-conductive metallic connector.

7. The electrically-conductive article of claim 6, wherein, in the opposing electrically-conductive metallic connector:
(iv) for each metallic micro-wire, the ratio of maximum height to minimum height is at least 1.05:1.

8. The electrically-conductive article of claim 6, wherein, in the opposing electrically-conductive metallic connector:
(v) the ratio of the average width of each metallic micro-wire to the average distance between two adjacent metallic micro-wires in each bundled pattern is at least 0.5:1 but less than 2:1.

9. The electrically-conductive article of claim 6, wherein the opposing electrically-conductive metallic connector comprises at least two adjacent metallic main wires, and the average distance between the at least two adjacent metallic main wires is greater than the average distance between any two adjacent metallic micro-wires in each bundled pattern.

10. The electrically-conductive article of claim 9, wherein the average distance between any two adjacent metallic micro-wires in each bundled pattern in the opposing electrically-conductive metallic connector is at least 2 μm and up to and including 10 μm.

11. The electrically-conductive article of claim 6, wherein the transparent substrate is a continuous polymeric web.

12. The electrically-conductive article of claim 1, wherein for each metallic micro-wire, the ratio of maximum height to minimum height is at least 1.1:1.

13. The electrically-conductive article of claim 1, wherein at least one metallic micro-wire has a maximum height that is the same as its center height.

14. The electrically-conductive article of claim 1, wherein at least one metallic micro-wire has a maximum height that is closer to its outer edge than to its center height.

15. The electrically-conductive article of claim 1, wherein each metallic micro-wire has a ratio of maximum height to average height of at least 1.05:1.

16. The electrically-conductive article of claim 1, wherein the average width of each metallic micro-wire is at least 5 μm and up to and including 20 μm.

17. The electrically-conductive article of claim 1, wherein each bundled pattern comprises at least one metallic cross-wire between adjacent metallic micro-wires that is not at the end of the adjacent metallic micro-wires.

18. The electrically-conductive article of claim 1, wherein each bundled pattern comprises multiple metallic cross-wires in a set of adjacent metallic micro-wires that are offset from multiple metallic cross-wires in an adjacent set of adjacent metallic micro-wires.

19. The electrically-conductive article of claim 18, wherein each of the multiple metallic cross-wires is substantially non-perpendicular to the adjacent metallic micro-wires.

20. The electrically-conductive article of claim 1, wherein the ratio of the average width of each metallic micro-wire to the average distance between two adjacent metallic micro-wires in each bundled pattern is at least 1:1 and up to and including 2:1.

21. A touch screen device comprising the electrically-conductive article of claim 1.

* * * * *